US009930351B2

(12) United States Patent
Andersson et al.

(10) Patent No.: US 9,930,351 B2
(45) Date of Patent: Mar. 27, 2018

(54) METHOD AND ARRANGEMENT FOR TRANSCODING A VIDEO BITSTREAM

(71) Applicant: Telefonaktiebolaget LM Ericsson (publ), Stockholm (SE)

(72) Inventors: Kenneth Andersson, Gävle (SE); Thomas Rusert, Stockholm (SE); Jonatan Samuelsson, Stockholm (SE); Rickard Sjöberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 52 days.

(21) Appl. No.: 14/912,327

(22) PCT Filed: Oct. 7, 2014

(86) PCT No.: PCT/SE2014/051172
§ 371 (c)(1),
(2) Date: Feb. 16, 2016

(87) PCT Pub. No.: WO2015/053697
PCT Pub. Date: Apr. 16, 2015

(65) Prior Publication Data
US 2016/0212438 A1 Jul. 21, 2016

Related U.S. Application Data

(60) Provisional application No. 61/889,647, filed on Oct. 11, 2013.

(51) Int. Cl.
*H04N 19/40* (2014.01)
*H04N 19/48* (2014.01)
(Continued)

(52) U.S. Cl.
CPC ............. *H04N 19/40* (2014.11); *H04N 19/12* (2014.11); *H04N 19/132* (2014.11);
(Continued)

(58) Field of Classification Search
CPC ...... H04N 19/132; H04N 19/40; H04N 19/48; H04N 19/12; H04N 19/176
(Continued)

(56) References Cited

U.S. PATENT DOCUMENTS 8,073,052 B1    12/2011  Xu et al.
2006/0245491 A1*  11/2006  Jam ..................... G06F 17/147
                                                        375/240.2

(Continued)

FOREIGN PATENT DOCUMENTS

WO    2014056150 A1    4/2014

OTHER PUBLICATIONS

Andersson, Kenneth et al., "Transcoder-friendly scalable coding", Joint Collaborative Team on Video Coding (JCT-VC) of ITU-T SG 16 WP 3 and ISO/IEC JTC 1/SC 29/WG 11 15th Meeting: Geneva, CH, Oct. 23, 2013, 1-12.

(Continued)

*Primary Examiner* — Michael Neff
(74) *Attorney, Agent, or Firm* — Murphy, Bilak & Homiller, PLLC

(57) ABSTRACT

The present invention relates to a method and a transcoder arrangement of transcoding a bitstream representing an original video source from an input format to an output format. The method comprises the steps of receiving (S10) the bitstream with the input video format, wherein the input video format is a high fidelity format; and receiving (S20) side information related to said video bitstream. Said side information comprising at least: a video bitstream representing the original video source with a low fidelity input video format, coding parameters optimized based on knowledge of the original video source; transform coefficients, indicative of a residual between the original video source and a decoded version of the high fidelity format. The method (Continued)

further comprises decoding (S40) said received side information to generate transcoding guiding information, estimating (S50) a representation of said bitstream with a low fidelity output format based on the received bit stream and the generated transcoding guiding information, adding (S60) the transform coefficients of the side information to transform coefficients generated from the estimated representation of said bitstream with the low fidelity output format to improve the estimated representation of said bitstream with the low fidelity output format and encoding (S50) the improved estimated representation of said bitstream with the low fidelity output format.

16 Claims, 11 Drawing Sheets

(51) Int. Cl.
H04N 19/176 (2014.01)
H04N 19/70 (2014.01)
H04N 19/12 (2014.01)
H04N 19/132 (2014.01)
H04N 19/182 (2014.01)
H04N 19/187 (2014.01)
H04N 19/33 (2014.01)
H04N 19/59 (2014.01)
H04N 19/18 (2014.01)
H04N 19/184 (2014.01)
H04N 19/44 (2014.01)

(52) U.S. Cl.
CPC ........... H04N 19/176 (2014.11); H04N 19/18 (2014.11); H04N 19/182 (2014.11); H04N 19/184 (2014.11); H04N 19/187 (2014.11); H04N 19/33 (2014.11); H04N 19/44 (2014.11); H04N 19/48 (2014.11); H04N 19/59 (2014.11); H04N 19/70 (2014.11)

(58) Field of Classification Search
USPC .......................................................... 375/242
See application file for complete search history.

(56) References Cited

U.S. PATENT DOCUMENTS

| | | | |
|---|---|---|---|
| 2007/0230568 A1 | 10/2007 | Eleftheriadis et al. | |
| 2008/0205784 A1* | 8/2008 | Akgun | G06T 3/403 382/254 |
| 2009/0125315 A1* | 5/2009 | Koishida | G10L 19/173 704/503 |
| 2009/0185747 A1 | 7/2009 | Segall et al. | |
| 2010/0228876 A1* | 9/2010 | Dankberg | H04B 7/18591 709/231 |
| 2011/0181782 A1* | 7/2011 | Ha | H04N 5/44591 348/569 |
| 2012/0179833 A1* | 7/2012 | Kenrick | H04N 21/23430 709/231 |
| 2014/0098883 A1 | 4/2014 | Hannuksela et al. | |
| 2015/0312575 A1* | 10/2015 | Bryant | H04N 19/115 375/240.08 |

OTHER PUBLICATIONS

Sun, Xiaoyan et al., "The framework for seamless switching of scalable bitstreams", International Organisation for Standardisation ISO/IEC JTC1/SC29/WG11 Coding of Moving Pictures and Audio MPEG 2002/8214 Jeju Island, Mar. 2002, 1-8.

Chen, Jianle et al., "High efficiency video coding (HEVC) scalable extension draft 3", Joint Collaborative Team on Video Coding (JCT-VC) of ITU-T SG 16 WP 3 and ISO/IEC JTC 1/SC 29/WG 11, JCTVC-N1008_v3, Vienna, AT, Jul. 25,-Aug. 2, 2013, Jul. 25,-Aug. 2, 2013, 1-68.

Unknown, Author, "H.265 High efficiency video coding", International Telecommunication Union, ITU-T, Series H: Audiovisual and Multimedia Systems, Infrastructure of audiovisual services—Coding of moving video, Apr. 2013, 1-317.

* cited by examiner

METHOD AND ARRANGEMENT FOR TRANSCODING A VIDEO BITSTREAM

TECHNICAL FIELD

The proposed technology generally relates to method and arrangement for transcoding a bitstream representing an original video source from an input format to an output format.

BACKGROUND

When video media is transmitted in a fixed or wireless communication system it is typically adapted or transcoded at some intermediate node between a source and a sink. The source may be exemplified by a media provider and the sink may be exemplified by a viewing device such as a mobile device. During the adaptation the video media is typically compressed which necessitates a number of bitrates to select from at the source node. An optimal bitrate would take both the network capabilities and the sink capabilities into consideration in order to utilize both the uplink and the downlink most efficiently. Thereby at time of encoding the video at the source, the source node is unaware of the end user capabilities and the network capabilities, and thus the intermediate node needs to adapt the video in order to provide it to the sink at a desired or necessary format. This requires a high quality from the source and a high level of computational complexity on the adaptation or transcoding node in order to optimize the use of downlink capabilities. The source needs to have high quality since it may need to be re-encoded at the transcoder to fit the downlink bandwidth or the capabilities of the receiving side.

SUMMARY

With reference to the above, there is a need for means and methods for improved coding enabling adaptation or transcoding of video media in an improved manner in order to optimize the utilization of the uplink and downlink resources.

It is an object to provide a solution that obviates some or all of the above described disadvantages.

This and other objects are met by embodiments of the present invention.

According to a first aspect, a method for a transcoder arrangement of transcoding a bitstream is provided. The bitstream is representing an original video source and is transcoded from an input format to an output format. In the method, the bitstream with the input video format is received, wherein the input video format is a high fidelity format. Further, side information related to said video bitstream is received and said side information comprises at least a video bitstream representing the original video source with a low fidelity input video format, coding parameters optimized based on knowledge of the original video source, and transform coefficients, indicative of a residual between the original video source and a decoded version of the high fidelity format. The received side information is decoded to generate transcoding guiding information and a representation of said bitstream with a low fidelity output format is estimated based on the received bit stream and the generated transcoding guiding information. The transform coefficients of the side information are added to transform coefficients generated from the estimated representation of said bitstream with the low fidelity output format to improve the estimated representation of said bitstream with the low fidelity output format. Moreover, the improved estimated representation of said bitstream is encoded with the low fidelity output format.

According to a second aspect, a transcoder arrangement of transcoding a bitstream representing an original video source from an input format to an output format is provided. Said transcoder arrangement is configured to receive the bitstream with the input video format, wherein the input video format is a high fidelity format. The transcoder arrangement is further configured to receive side information related to said video bitstream, and said side information comprises at least:

a video bitstream representing the original video source with a low fidelity input video format, coding parameters optimized based on knowledge of the original video source; and transform coefficients, indicative of a residual between the original video source and a decoded version of the high fidelity format. Said transcoder arrangement is further configured to decode said received side information to generate transcoding guiding information, to estimate a representation of said bitstream with a low fidelity output format based on the received bit stream and the generated transcoding guiding information, to add the transform coefficients of the side information to transform coefficients generated from the estimated representation of said bitstream with the low fidelity output format to improve the estimated representation of said bitstream with the low fidelity output format; and to encode the improved estimated representation of said bitstream with the low fidelity output format.

An advantage with the embodiments is that they enable/make it possible to reduce the computational complexity of the adaptation or transcoding process.

Other advantages will be appreciated when reading the detailed description.

BRIEF DESCRIPTION OF THE DRAWINGS

The embodiments, together with further objects and advantages thereof, may best be understood by referring to the following description taken together with the accompanying drawings, in which:

FIG. 6 illustrates further embodiments;

DETAILED DESCRIPTION

Throughout the drawings, the same reference numbers are used for similar or corresponding elements.

As used herein, the term "User Equipment", UE, may refer to any device, such as a cellular phone, video camera, a Personal Digital Assistant, a smart phone, a laptop or Personal Computer, PC, e.g. equipped with an internal or external mobile broadband modem, a tablet PC with communication capabilities, a portable electronic communication device, a sensor device equipped with radio communication capabilities or the like. In particular, the term "UE" should be interpreted as a non-limiting term comprising any device equipped with a video decoder.

As used herein, the term transcoder arrangement may refer to a transcoding or adaptation device which may be located in a network node. An example of a network node is a server that has connections with both the video media (YouTube, Netflix) and the end-users (mobile devices, PCs, TVs). A transcoder typically consist a video decoder and a video encoder. The video is decoded to pixel values and then re-encoded to another format/bitrate.

The proposed technology is best understood in the context of a system wherein a source node, such as a video provider, provides both an encoded video bitstream as input video signal and side information to an intermediate node, such as a transcoding or adaptation node, which in turn provides an encoded video bitstream as an output video signal. The output video signal can subsequently be received and displayed at a sink node, such as a user equipment or the like.

For a better understanding of the proposed technology, it may be useful to begin with a brief overview of current adaptation and transcoding methods and their benefits.

Figure 1:
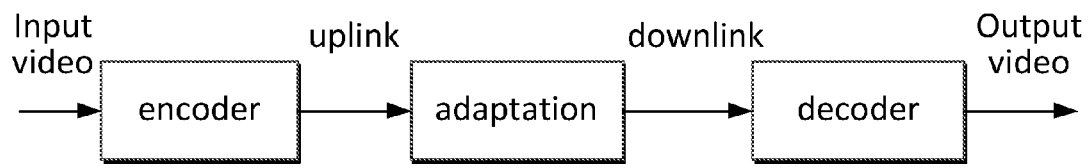
FIG. 1 is an illustration of a basic adaptation scheme according to prior art.

FIG. 1 depicts a scenario where an input video signal is encoded (compressed) in a sending device (encoder), then transmitted through a network and/or stored (as denoted by uplink, adaptation, and downlink, which is explained further below), and then received and decoded (decompressed) by a receiving device (decoder). The output video can then e.g. be displayed to the end user at the receiving device.

Typically in video coding, encoding parameters such as coding algorithms to use (e.g. video coding standard and profile to use), video resolution, frame rate, quality, bit rate, etc., need to be decided at the time of encoding. The optimal encoding parameters depend on the capabilities of the receiving device (computational capabilities and memory) as well as the capacity of the network links involved e.g. available bandwidth. These parameters may in many scenarios not be known at the encoding time, e.g. when the network characteristics vary over time or over location of the receiver, or when the video is sent to more than one receiving device, each receiving device having different capabilities or different associated network access characteristics. In such cases, in order to optimally cope with available network resources, device characteristics and user experience when consuming the content, it is required to adapt the compressed video signal during the transmission in the network, as depicted by "adaptation" in FIG. 1.

The network link from the sender (encoder) to the adaptation node is denoted as "uplink". The network link from the adaptation node to the receiver (decoder) is denoted as "downlink". Both uplink and downlink bandwidths are typically scarce resources. In the case both sender and receiver are end-user devices (e.g. smartphone or laptop) connected to fixed or mobile networks, the uplink is typically a bottleneck, since uplink bandwidth is typically lower than downlink bandwidth (e.g. in ADSL networks or cellular networks). In the case the sender is a video server such as streaming server, or video on demand server, or video cache) and the receiver is an end user-device (e.g. smartphone, tablet or TV, the downlink bandwidth is often a bottleneck which determines the video quality that can be delivered to the user (e.g. in the case when the end-user is connected via DSL or cellular access). Furthermore, the uplink may also be an expensive resource, e.g. in case many different content needs to be delivered from the sender (e.g. video on demand server) to end users in this case the uplink could be a content distribution network, CDN.

Besides network capacity, other scarce resources include computational and memory capabilities in the sender and receiver, and in particular in the adaptation or transcoding node.

The problem to be solved is to provide a scheme for video encoding/adaptation/decoding to optimize network utilization by minimizing uplink and downlink bit rates, while at the same time minimizing the computational/memory complexity in the encoder, adaptation node, and decoder.

Video coding methods, such as H.264/AVC and H.265/HEVC, are typically based on the so-called hybrid video coding scheme.

In the hybrid video coding scheme, an encoder as exemplified in FIG. 1 typically performs the following basic steps, applied to every picture in the video sequence, on a per-block basis:

1. A prediction operation is performed comprising: predicting the original video signal (e.g. pixel data) based on previously encoded and reconstructed pixel data, and computing the difference between the original video signal and the prediction. This difference is called "residual data" or "residual signal" or "residual". The prediction operation for a certain block can be based on pixels in the same picture as the currently encoded block, then called "intra prediction", or based on pixels in previously encoded pictures, then called "inter prediction". The source data used for the prediction is called "prediction reference". In order to improve inter prediction effectiveness; a so-called motion compensation operation is typically applied, which is based on motion vectors that indicate the displacement of the currently encoded block relative to the reference picture.

In order to achieve high compression efficiency, the encoder needs to try many different encoding parameters for each block such as coding modes, block partitionings, motion vectors, etc., a process that is sometimes referred to as mode/motion estimation and/or rate-distortion optimization (RDO). The process could be interpreted as a further step that precedes the prediction step.

2. A spatial transform operation is performed to transform the prediction residual signal into a frequency domain.

3. The resulting transform coefficients are quantized and entropy-encoded e.g. using context-adaptive binary arithmetic coding, CABAC. Further data such as indication of block partitioning, prediction mode (inter/intra), motion vectors, etc., is entropy encoded as well. The output of the entropy encoding stage is referred to as the "bitstream".

4. The encoder performs parts of the decoding process (see below) in order to generate reference information to be used for encoding subsequently blocks.

In the following, the application of inter and intra prediction operations and the generation of the residual data in the encoder (step 1 above) will be referred to as "motion-compensated residual generation".

The decoder in FIG. 1 typically performs the following basic steps, applied to every picture in the video sequence, on a per-block basis:

1. Entropy decoding quantized transform coefficients and other data to control the decoding/pixel reconstruction process.
2. Performing inverse transform of the decoded quantized transform coefficients to obtain the reconstructed prediction residual.
3. Performing prediction operations depending on the prediction mode and motion information signaled in the bitstream (inter/intra mode, motion vectors etc.), and adding the reconstructed prediction residual to the prediction, obtaining the intermediate reconstructed pixel data.
4. Performing filtering operations (e.g. de-blocking, sample-adaptive offset, SAO), depending on the intermediate reconstructed pixel data, generating the final reconstructed pixel data.

In the following, the application of inter and intra prediction operations and the generation of the intermediate and final reconstructed pixel data in the decoder will be referred to as "motion-compensated reconstruction".

Encoding is typically significantly more demanding than decoding in terms of computational complexity. The reason for that is that in order to achieve high compression efficiency, the encoder needs to try many different encoding parameters for each block such as coding modes, block partitioning, motion vectors, etc. The encoder is typically not standardized, so that encoders may choose to try few different encoder parameters; however, that will come at the cost of reduced compression efficiency.

Several video encoding/distribution concepts exist to address the abovementioned problem of adaptive video distribution. Those encoding/distribution concepts can be categorized into (1) simulcast distribution, (2) scalable video coding, and (3) transcoding.

In the case of simulcast distribution, the sender encodes the video in several different video representations, i.e. with different encoding parameters such as different video resolutions, and the resulting compressed bitstreams are transmitted through the uplink simultaneously. Then in the adaptation node, the most appropriate video stream is selected, considering downlink properties and receiver properties. Simulcast is inefficient in terms of uplink usage because several bitstreams have to be sent for the same content. Simulcast imposes relatively low complexity in the adaptation, since it involves only selective forwarding of the most appropriate video representation. Simulcast is efficient in terms of downlink utilization because each compressed video bitstream can be fully optimized for the downlink, or at least considering receiver capabilities such as screen resolution. The adaptation node forwards one selected bitstream for the downlink, this utilizes the downlink with zero overhead.

In the case of scalable coding, the sender encodes several different video representations, similarly to simulcast. The main difference to simulcast is that in order to improve compression efficiency and thus bandwidth utilization on the uplink, the representations are compressed in a dependent manner. One example of scalable coding is spatially scalable coding. Spatially scalable coding is performed in at least two layers, where one of the layers has a smaller resolution, typically referred to as the base layer, than the other layer, typically referred to as the enhancement layer. After decoding the base layer, the enhancement layer data can, in addition to be predicted from previous enhancement layer pictures, be predicted from pixel data or other data (such as motion vectors) of the base layer through up-sampling/interpolation. The high-resolution representation is thus depending on the low resolution. This dependency helps in many cases to achieve better coding efficiency than coding the resolutions separately. Thus, scalable coding is in general more bandwidth efficient than simulcast in the uplink. However the dependency causes a significant loss in coding efficiency for the highest resolution compared to single layer coding at that highest resolution, because to enable decoding of the high resolution video the decoder must receive both base layer and enhancement layer.

In SHVC "High efficiency video coding (HEVC) scalable extension draft 3", JTVC-I008_v3, July, 2013 the coded layer with low resolution referred to as the base layer can be re-used by two methods of inter-layer prediction to improve the coding efficiency of the high resolution (enhancement layer). One method is to up-sample regions of pixel data of the high resolution from the low resolution. The other method is to re-use motion information from the low-resolution video for prediction of motion information for some regions of the high-resolution video.

In the so-called reference index (refIdx) approach considered in the SHVC development, the inter-layer pixel prediction is done by inserting an additional, up-sampled, reference picture into the reference picture buffer of the enhancement layer. The additional reference picture consists of the low-resolution layer up-sampled to the resolution of the high-resolution layer. The re-use of motion information from the encoded low-resolution layer is done by up-scaling motion vectors from the low-resolution layer and using them for prediction using a "temporal motion vector prediction" method (TMVP) as specified in HEVC ITU-T H.265 (April 2013) SERIES H: AUDIOVISUAL AND MULTIMEDIA SYSTEMS Infrastructure of audiovisual services-Coding of moving video.

One approach to deal with the significant loss in coding efficiency for the high resolution with scalable coding is to jointly optimize the coding of the layers so that the small resolution is used more efficiently when encoding the high-resolution. This allows trading the compression efficiency of low and high-resolution video representations against each other.

Figure 2:
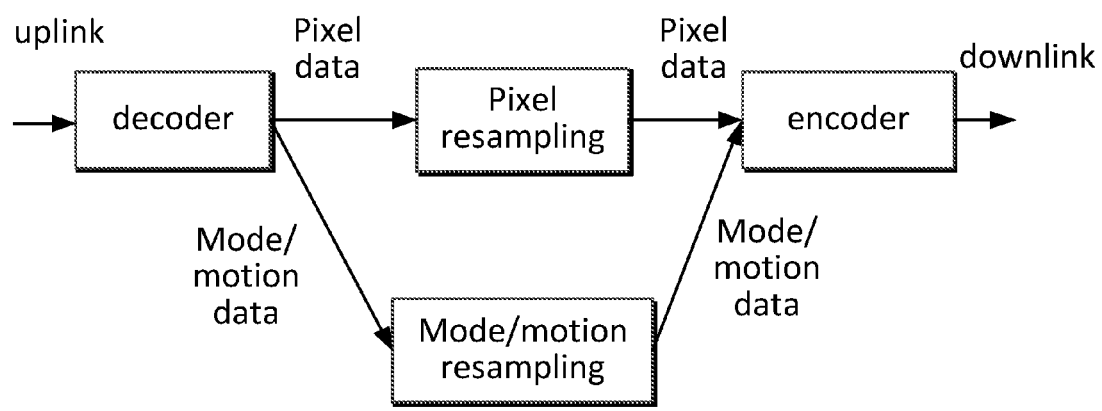
FIG. 2 is an illustration of a transcoding scheme according to prior art.

Advanced transcoding methods use data available in the uplink bitstream, such as information about coding modes and motion vectors used in the uplink bitstream, in order to speed-up the encoding step. This is shown in FIG. 2 which depicts an example of an adaptation node. FIG. 2 shows the pixel resampling step that may be needed in order to change video resolution or frame rate. Accordingly, mode and motion data may be resampled, too. The re-use of mode and motion data can reduce the complexity of the transcoding, however in order to achieve good utilization of the downlink capacity, it is still necessary to spend high complexity in the encoding step of the transcoder.

In a general embodiment, transcoding or adaptation is performed based on both a received video bitstream and received side information. The side information can be utilized to guide the transcoding process in order to reduce the computational complexity of the transcoding process and to optimize both the downlink and uplink resources.

To be able to provide scalability with high coding efficiency both from an encoding device to a network node (uplink) and from the network node to the end user device (downlink) it is proposed to add new functionality to SHVC. It is suggested to that a low fidelity representation can be derived from the reconstructed pixel values of the high fidelity representation. This enables gains compared to simulcast to be achieved in the uplink at the same time as a high fidelity can be represented without any loss compared to HEVC and also be compatible with HEVC (down link to the end user device). Inter-layer prediction from SHVC can be reused to provide further gains over simulcast. To be able to reconstruct the low fidelity representation it is needed to specify an additional decoding process before the inverse quantization and inverse transformation. There are no changes to the syntax below VPS.

This new functionality can be used by a transcoder to get a version 1 compatible transcoded low fidelity bitstream with better coding efficiency than that can be achieved by a transcoder and without computationally demanding mode and motion estimation.

One important use case is IP based video delivery providing a coding efficient bitstream from an encoding device to a network node (uplink/UL) and depending on the network characteristics from the network node to an end device (downlink/DL) provide a coding efficient HEVC version 1 bitstream suitable to the available bandwidth. In the best of worlds both the uplink and the downlink should have same coding efficiency as encoding for a single representation.

One approach to support this use case is to simulcast bitstreams, e.g. encode several fidelities independently and send them to a network node (UL). The network node can then forward the most suitable bitstream to the end device (DL). The nice feature of simulcasting HEVC version 1 bitstreams is that each bitstream can be coded very efficiently for the DL and thus require minimal size for respective quality. The draw-back of simulcast is the redundancy of having several independent encodings of more or less the same content in the UL.

Scalable coding has the capability to represent several fidelities by the use of layered coding. The higher fidelities depend on the lower fidelities to reduce the overhead for representing them. Scalable coding can thus reduce the redundancy of independent coding of several fidelities as in simulcast. SHVC can reduce the overhead for coding several fidelities in UL compared to simulcast by 21% for random access and 12% for low delay with SNR scalability common conditions. The low fidelity base layer can be coded very efficient and thus require minimal size for its use in the DL and it can be decoded by a HEVC version 1 decoder. The higher fidelities get an overhead due to the dependency to the lower fidelities for its use in the DL. SHVC has an overhead of 14% for random access and 24% for low delay with SNR scalability common conditions compared to HEVC version 1 and cannot be decoded with a HEVC version 1 decoder so it fails to fit the use case.

Figure 4:
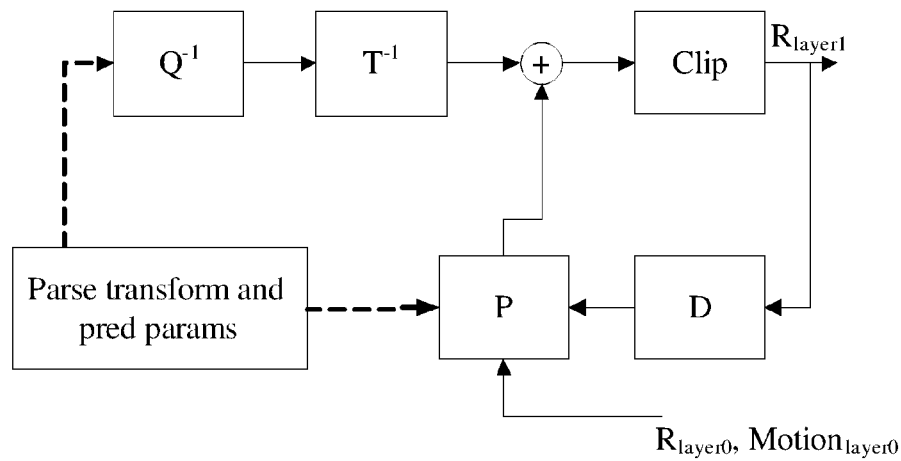
FIG. 4-8 illustrate schematically different aspects of the embodiments of the present invention.
Figure 5:
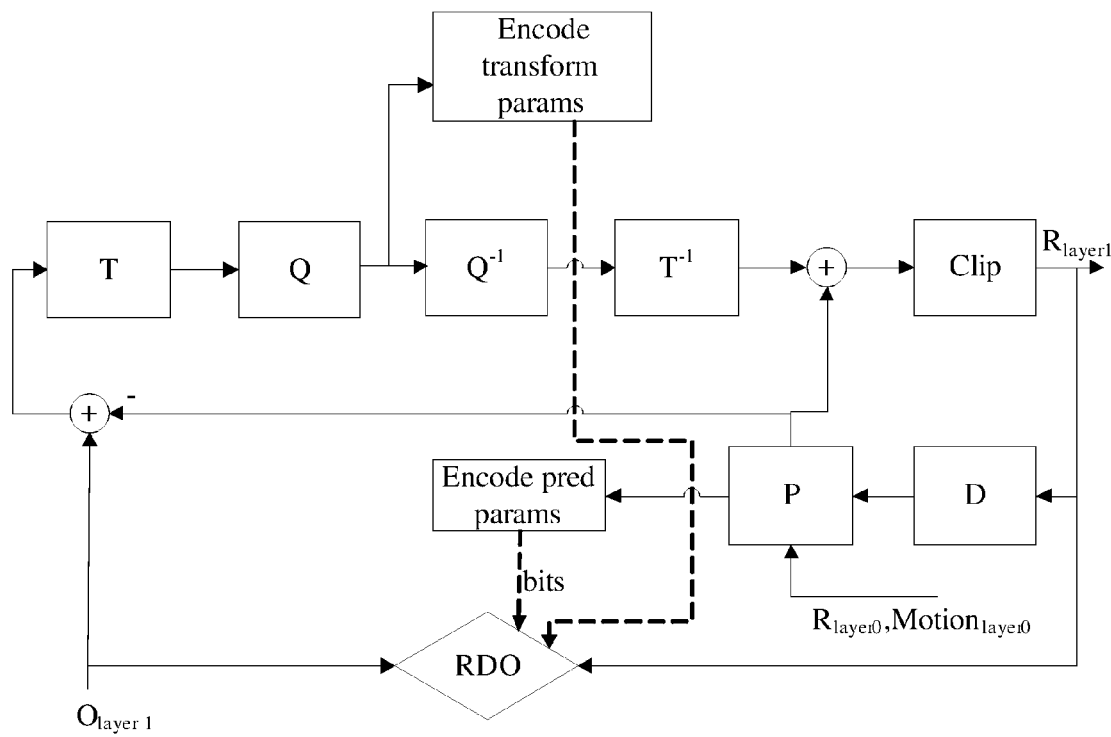

The decoding and encoding processes for a higher layer of SHVC is shown in FIG. 4 and in FIG. 5, here layer 1, excluding the loop filter (de-blocking and SAO) which is after the clipping. In FIG. 4, the decoding process for a dependent layer of SHVC is illustrated, where Q is quantization, T is transformation and P is prediction, D is delay, R is the reconstructed pixel values. In FIG. 5, the encoding process for a dependent layer of SHVC is illustrated, where RDO is rate distortion optimization and O is the original video source.

Figure 6:
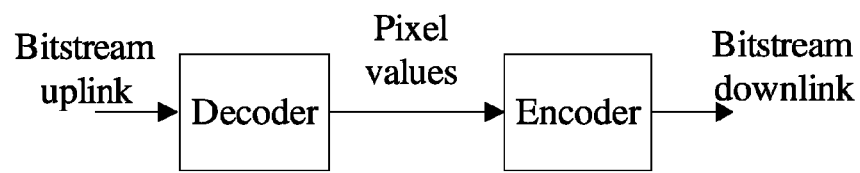

Transcoding has the capability to provide several lower fidelities by re-encoding the received higher fidelity HEVC version 1 bitstream in the UL before sending it in the DL. The coding efficiency of the high fidelity bitstream in the UL can be very good and a significant part of the overhead compared to simulcast can be reduced. If the high fidelity is required for the DL the high coding efficiency is kept and an HEVC version 1 decoder can be used. If the low fidelity is required, the high fidelity bitstream needs to be decoded and then re-encoded at a lower fidelity. The lower fidelity bitstream can be decoded by a HEVC version 1 decoder but it will have worse coding efficiency than a low fidelity bitstream in a simulcast scenario since it has to rely on the quality of the reconstructed high fidelity video for its encoding. To achieve an as efficient representation as possible of the low fidelity bitstream it is required to spend a significant amount of computations. The result will still have overhead compared to a low fidelity of a simulcast scenario. A transcoder can take short cuts to speed up the transcoding, e.g. re-using motion information, but that comes at the cost of worse coding efficiency of the low fidelity bitstream. The transcoder has potential to accomplish the use case but to do that it will require huge amount of computation and still not have high coding efficiency for the low fidelity bitstream to fit the use case. An example of full transcoding is shown in FIG. 6, where only pixel values from the decoding are used.

To support the use case of a coding efficient HEVC version 1 bitstream for the end points in DL the inventors propose to extend SHVC with new functionality so that it has the ability to provide the highest fidelity in the base layer and have the lower fidelities coded with dependency to the highest fidelity to get an efficient representation in UL.

In other words, it is suggested to utilize information relating to higher fidelity to dependently encode lower fidelities and thereby provide an efficient representation in the UL. Thereby, the encoding of multiple layers is performed in a dependent manner, which further reduces the computational complexity in a transcoder or transcoder arrangement. Further, side information enabling decoding of the thus encoded bitstreams is generated and provided according to the embodiments of the present invention as described below.

Hence, the low fidelity is dependent on the high fidelity. The embodiments can be performed with the concept of layered bitstream where the base layer has the high fidelity and each additional layer defines a side information for a specific lower fidelity. The embodiments can also be performed by having separate high fidelity bitstream and one or more low fidelity side information bitstreams.

Figure 7:
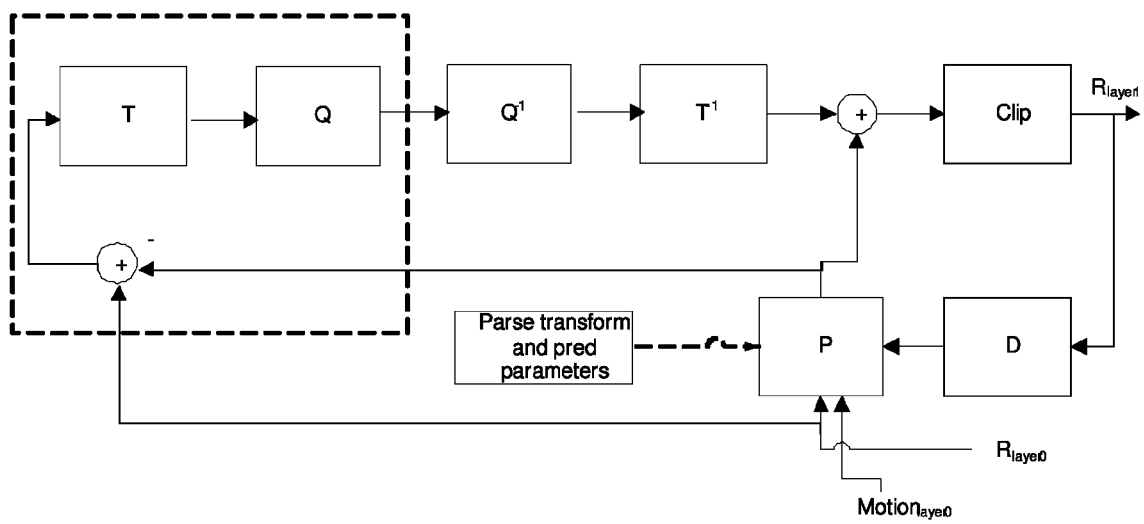

FIG. 7 shows a transcoder where a decoded version of the high fidelity format is indicated as Rlayer0 (possibly after down-sampling, if the high fidelity format has larger resolution than the low fidelity format). The parsed prediction parameters coding parameters in the side information are used to obtain a prediction for the low fidelity format (P in the figure) which is subtracted from Rlayer0 to obtain prediction error related to the low fidelity format. The prediction error is transformed (T) and quantized (Q) according to the parsed transform parameters to obtain transform coefficients. The transform coefficients are inverse quantized ($Q^{-1}$) and inverse transformed ($T^{-1}$) to obtain coded prediction error which then is added to the prediction (P) to generate the reconstruction of the low fidelity format Rlayer1. Clipping (Clip) is performed to insure that the pixel values are within allowed range. This is not the output of the transcoder but is needed to be able to generate inter picture prediction which is used for the generation of transform coefficients. When the transform coefficients have been generated (output of the dashed box) all coding parameters related to the low fidelity format are available and can thus be encoded to a complete low fidelity format bitstream. Thus, the transform and quantization are performed before the normal decoding process. Thereby, the transform coefficients are re-generated based on information from at least two different layers in order to reduce the computational complexity in any subsequent transcoding or adaptation step. It should be noted that in-loop filtering is not shown in FIG. 9, but is also part of the coding loop.

Figure 8:
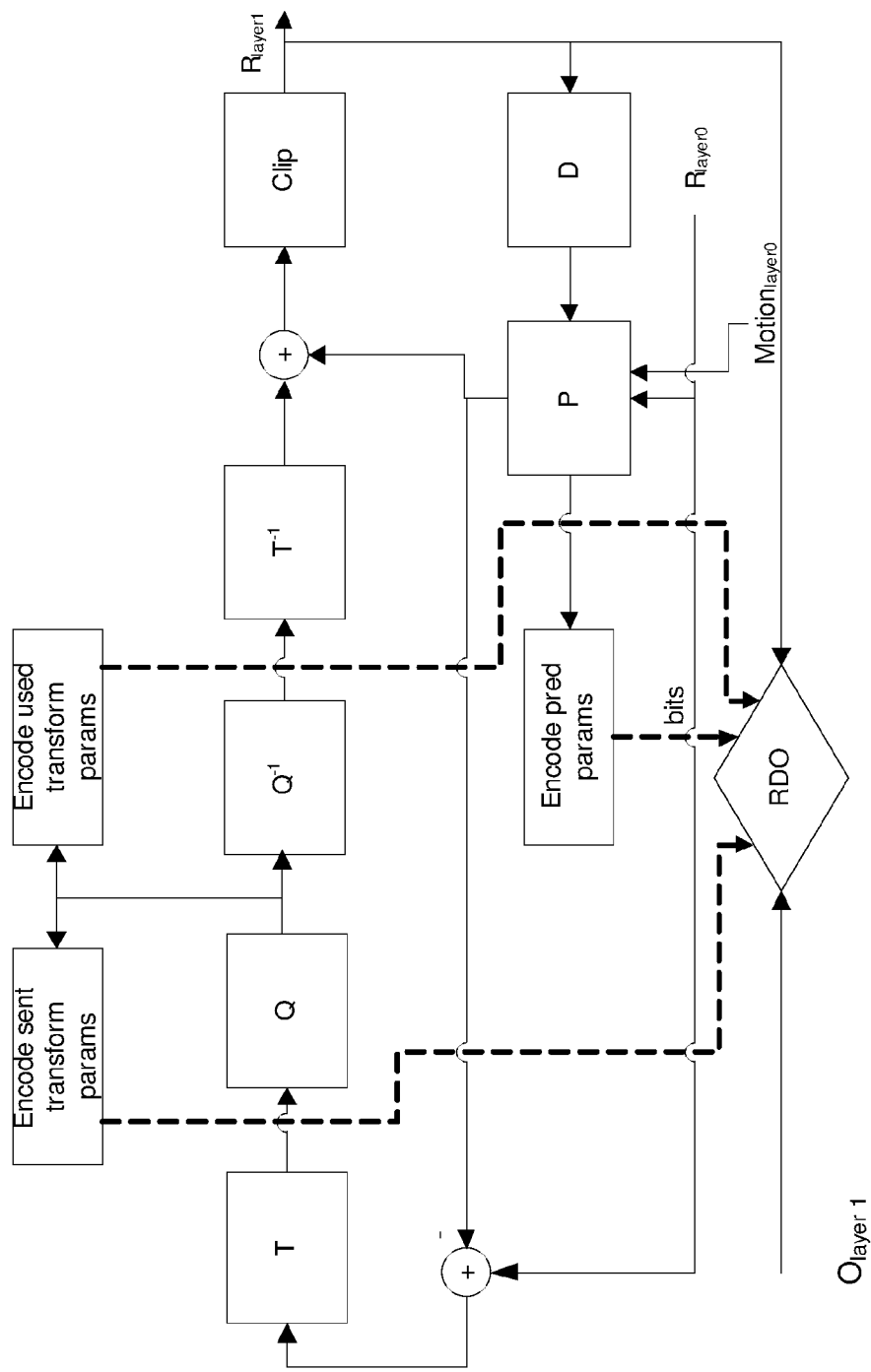

FIG. 8 shows an encoder that generates a high fidelity bitstream and low fidelity side information corresponding to FIG. 7. In-loop filtering is excluded from the figure but is also part of the coding loop.

A decoded version of the high fidelity format is indicated as Rlayer0 (possibly after down-sampling, if the high fidelity format has larger resolution than the low fidelity format). The low fidelity side information is generated by searching for best coding parameters (RDO) to derive a prediction with is subtracted from the Rlayer0. The prediction error is transformed (T) and quantized (Q). The transform coefficients are inverse quantized ($Q^{-1}$) and inverse transformed ($T^{-1}$) to obtain coded prediction error which then is added to the prediction (P) to generate the reconstruction of the low fidelity format Rlayer1. The coding parameters are optimized with respect to the original video source for the low fidelity format Olayer1. This means that the coding parameters are selected such that Rlayer1 becomes as similar as Olayer1 as possible. The coding parameters (transform and prediction parameters) are then coded to represent side information for the low fidelity format. The used transform coefficients corresponds to the transform coefficients that will be re-generated by a transcoder and need thus not to be coded. The sent transform coefficients correspond to the side information of the low fidelity format that is sent to the transcoder. One approach is to encode the sent transform coefficients with as little overhead as possible, e.g. one coefficient equal to 1 and the rest equal to 0.

Figure 9:
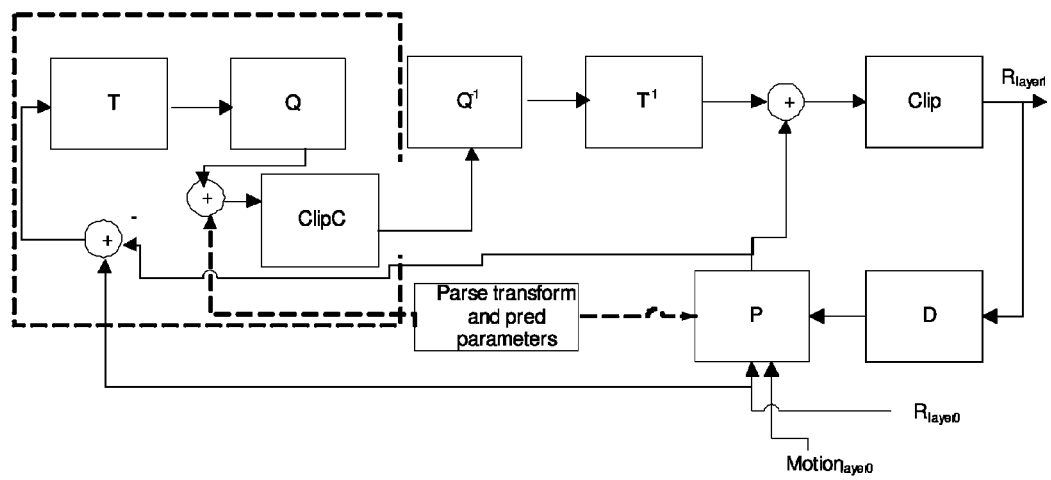
FIG. 9 illustrates schematically an embodiment of the present invention.

According to an embodiment of the present invention, the idea is to refine the parsed/decoded coefficients (e.g. TransCoeffLevel) by the coefficients obtained by the coefficient generation/prediction part of the processes as shown in FIG. 9. FIG. 9 illustrates the decoding process for refining parsed coefficients by the coefficient generation/prediction in which the proposed additional process is within the dashed box. In this case a clipping (ClipC) is needed after the addition to ensure that they fit the inverse quantization and transformation (the other clipping (Clip) is to ensure that the reconstructed pixel values lies within the permitted range of values according to the bit depth of the video).

Accordingly, FIG. 9 shows a transcoder that generates transform coefficients based on both the low fidelity format side information and a decoded version of the high fidelity format. It should be noted that in-loop filtering is excluded from the figure but may be part of the coding loop.

A decoded version of the high fidelity format is indicated as Rlayer0 (possibly after down-sampling, if the high fidelity format has larger resolution than the low fidelity format bitstream). In this case the transform coefficients in the side information are added to the transform coefficients obtained by taking the difference between Rlayer0 and the prediction of the low fidelity format (output of the dashed box). Clipping is performed to assure that the coefficients are within allowed range (ClipC). The combined transform coefficients (output of the dashed box) are then coded together with other coding parameters of the low fidelity format side information to generate a low fidelity format bitstream.

Figure 3:
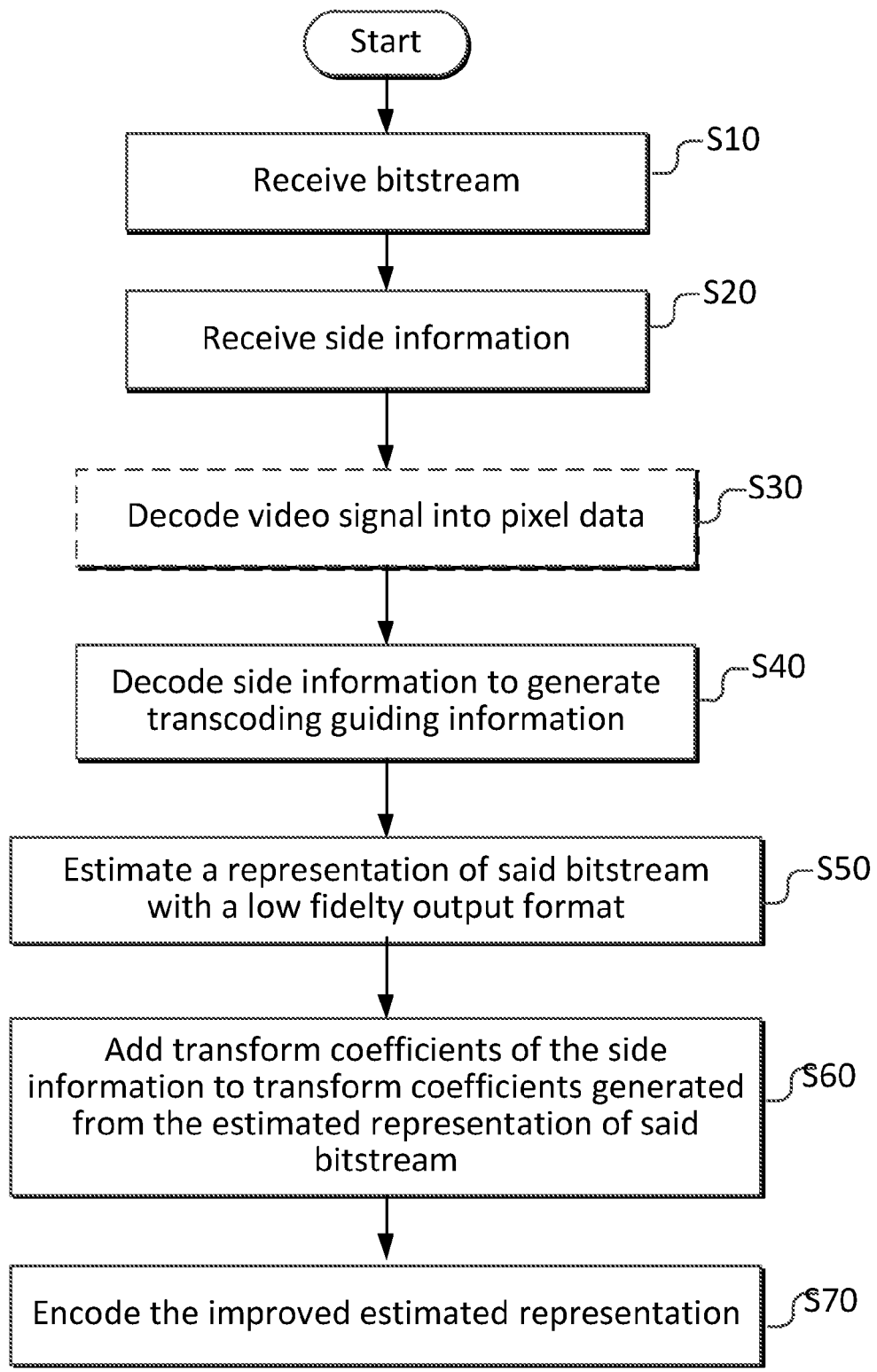
FIG. 3 is a flow chart illustrating a method according embodiments of the present invention.

As illustrated schematically in the flowchart of FIG. 3, a method for a transcoder arrangement of transcoding a bitstream representing an original video source from an input format to an output format is provided. The transcoder arrangement receives S10 the bitstream with the input video format, wherein the input video format is a high fidelity format. It further receives S20 side information related to said video bitstream. Said side information comprises at least a video bitstream representing the original video source with a low fidelity input video format, coding parameters optimized based on knowledge of the original video source and transform coefficients, indicative of a residual between the original video source and a decoded version of the high fidelity format. The transcoder arrangement decodes S40 said received side information to generate transcoding guiding information and estimates S50 a representation of said bitstream with a low fidelity output format based on the received bit stream and the generated transcoding guiding information. Further the transform coefficients of the side information are added S60 to transform coefficients generated from the estimated representation of said bitstream with the low fidelity output format to improve the estimated representation of said bitstream with the low fidelity output format. The improved estimated of the representation of said bitstream with the low fidelity output format is encoded S70 and sent to a rendering device. Thus, the side information is utilized in the adaptation process such that it allows the adaptation process to be performed with lower complexity than with transcoding without side information while still providing high compression efficiency. Thus good downlink bandwidth utilization can be achieved. The output of the adaptation process is a non-scalable video bitstream which implies that the decoding of the bitstream from the adaptation process can be done with a low-complex non-scalable decoder.

According to an embodiment, a further step is added, wherein said received video bitstream is decoded to provide pixel data as said representation of said received video bitstream. In our case the transcoder always needs to decode the high fidelity bitstream to obtain pixel data which is used for re-generating the residual. Some transcoder arrangements may only operate in the coding parameter domain According to a further embodiment, the residual between the original video source and a decoded version of the high fidelity format is a quantized and/or transformed residual.

The side information may also comprise residual information related to said predetermined input video format.

In some embodiments, the method comprises the further step of identifying an indication about the presence of said side information within said video bitstream.

In addition, said predetermined input video format and said predetermined output video format may comprise different color representations of a video, or different video codecs.

The side information may be transmitted and received separately from said video bitstream or together with said video bitstream. For example, the side information and the encoded video bitstream can be transmitted together as an interleaved bitstream, or in separate layers within a single carrier, or in separate carriers or channels. In order to enable a receiving transcoding node to utilize the provided side information, optionally an indication of the provided side information as well as optionally an indication of the potential use of the provided side information can be transmitted to the transcoding node.

As an example the side information can be provided as one layer of a scalable video bitstream in which one high fidelity layer comprises the main video and one or more low fidelity layers comprise the side information. In this case an indication can be provided in the scalable video bitstream that one or several layers has/have transcoding dependency with the first layer. The indication can be defined in the video parameter set (VPS) and/or in a SEI message in the beginning of the bitstream or in a separate channel. Another alternative is to provide the side information in a separate video bitstream e.g. HEVC in addition to a single layer bitstream e.g. HEVC. Each bitstream can in that case include a SEI message in the beginning of the bit streams that indicate what it can be used for or have the indication in a separate channel. In a further embodiment the side information is provided in a separate channel altogether.

For some occasions, it is necessary to provide the transcoder arrangement with information concerning the encoding process of the video provider arrangement. One such particular case could be the input video having a high resolution and the output video having a low resolution. In that case, also information concerning any down-sampling process in the transcoder needs to be provided in the side information or in some predetermined specification. In particular, it might be necessary to provide information enabling the transcoder to e.g. properly down sample high resolution pixel data to low resolution pixel data.

The side information can be transmitted in a plurality of different ways, including as at least one SEI message, encapsulating mode/motion information, as auxiliary picture in the video bitstream, as a scalable layer with a different layer-id than the main video.

In some cases, the side information could contain a complete bitstream or a layer of a bitstream. In such a case an indication is provided in the video provider arrangement, which indication guides the transcoder arrangement to which parts of the provided bitstream it should modify.

These are only a few of the possible types of guiding information that can be generated or provided in the side information sent to a transcoder arrangement.

With respect to the example described in conjunction with FIG. 9, this can be implemented as a modification as shown below in section Forward scaling process for forward transform coefficients, step 7. An alternative is to specify it as side information in an SEI message or for auxiliary pictures.

The example below is an exemplary implementation where TransCoeffLevel are the transform coefficients that are decoded in the sideinformation bitstream. intLevel is the re-generated transform coefficients based on the reconstruction of the high quality bitstream. As mentioned above, an approach of the embodiment is to refine the re-generated transform coefficients based on the TransfCoeffLevel that are part of the side information.

Forward Scaling Process for Forward Transform Coefficients

Inputs to this process are:
a luma location (xTbY, yTbY) specifying the top-left sample of the current luma transform block relative to the top left luma sample of the current picture,
a variable nTbS specifying the size of the current transform block,
a variable cIdx specifying the colour component of the current block,
a variable qP specifying the quantization parameter,
an array of forward transform coefficients d with elements d[x][y]

Output of this process is the (nTbS)×(nTbS) array TransCoeffLevel of transform coefficients with elements TransCoeffLevel[xTbY][yTbY][cIdx] [x][y].

The transform coefficients are modified by the following ordered steps:
1. intLevel[x,y] is set equal to d[x,y]
2. intSign[x,y] is set equal to −1 if intLevel[x,y] is less than 0 otherwise it is set to 1.
3. fwdScaleFactor=fwdLevelScale [Qp % 6] where fwdLevelScale={26214, 23302, 20560, 18396, 16384, 14564}
4. int64Level[x,y] is set equal to abs(intLevel[x,y])*fwdScaleFactor
5. intLevel[x,y] is set equal to (int64Level[x,y]+intAdd)>>intQBits
   where intQBits is equal to 29+Qp/6-bitDepth-log2(nTbS),
   bitDepth is equal to $bitDepth_Y$ when cIdx is equal to 0 and otherwise equal to $bitDepth_C$,
   intAdd is equal to 171>>(intQBits−9) if slice type is equal to I or the inter-layer picture rsPic is an RAP, otherwise intAdd is equal to 85<<(intQBits−9)
6. intLevel[x,y] is set equal to intLevel[x,y]*intSign[x,y]
7. TransCoeffLevel[xTbY][yTbY][cIdx] [x][y] is set equal to Clip3(−32768, 32767, TransCoeffLevel[xTbY][yTbY] [cIdx] [x][y]+intLevel[x,y])

A variant is to add an offset in step 14, described in section Forward scaling process for forward transform coefficients below, that corresponds to compensating for the smallest value that needs to be sent in order to completely re-use the transform size. If this is specified to be a DC value of 1 and the having the other coefficients set to zero the decoder can do the following:

If(x==0 && y==0)
  TransCoeffLevel[xTbY][yTbY][cIdx] [x][y] is set equal to Clip3(−32768, 32767, TransCoeffLevel[xTbY][yTbY][cIdx] [x][y]+intLevel[x,y]−1)
else
  TransCoeffLevel[xTbY][yTbY][cIdx] [x][y] is set equal to Clip3(−32768, 32767, TransCoeffLevel[xTbY][yTbY][cIdx] [x][y]+intLevel[x,y])

This means that when an encoder is sending coefficients (TransCoeffLevel) that corresponds to a 1 at the first coefficient position and otherwise zeros it will not change the re-generated coefficient value intLevel.

To enable a decoder to know when it shall do the proposed decoding process the inventors suggest to provide one new dependency_type in VPS in parallel to addition to existing inter-layer motion and sample based dependency types. Thus an SHVC encoder could use the existing dependencies to further improve the bitrate reduction in the uplink compared to simulcast.

To have a minimal and clean design the inventors suggest to use the transpose of the inverse transform as the transform to be used and that the quantization is done without RDOQ, sign bit hiding and using flat scaling matrices.

The sections below disclose examples how this could be implemented in SHVC. See the underlined text. It can be noted that there are no changes to the syntax below VPS.

Video Parameter Set Extension Semantics direct_dep_type_len_minus2 plus 2 specifies the number of bits of the direct_dependency_type[i][j] syntax element. In bitstreams conforming to this version of this Specification the value of direct_dep_type_len_minus2 shall be equal 1. Although the value of direct_dep_type_len_minus2 shall be equal to 1 in this version of this Specification, decoders shall allow other values of direct_dep_type_len_minus2 in the range of 0 to 30, inclusive, to appear in the syntax.

direct_dependency_type[i][j] indicates the type of dependency between the layer with nuh_layer_id equal layer_id_in_nuh[i] and the layer with nuh_layer_id equal to layer_id_in_nuh[j]. direct_dependency_type[i][j] equal to 0, 2, 4 or 6 indicates that the layer with nuh_layer_id equal to layer_id_in_nuh[j] is used for inter-layer sample prediction of the layer with nuh_layer_id equal layer_id_in_nuh[i]. direct dependency type[i][j] equal to 1, 2, 5 or 6 indicates that the layer with nuh layer id equal to layer id in nuh[j] is used for inter-layer motion prediction of the layer with nuh layer id equal layer id in nuh[i]. direct dependency type[i][j] equal to 3, 4, 5 or 6 indicates that the layer with nuh layer id equal to layer id in nuh[j] is used for residual re-generation of the layer with nuh layer id equal layer id in nuh[i]. Although the value of direct_dependency_type[i][j] shall be in the range of 0 to 6, inclusive, in this version of this Specification, decoders shall allow values of direct_dependency_type[i][j] in the range of 7 to 232−2, inclusive, to appear in the syntax.

The variables NumDirectRefLayers[i], and RefLayerId[i][j] SamplePredEnabledFlag[i][j], MotionPredEnabledFlag[i][j], ResidualReGenerationEnabledFlag[i][i] and DirectRefLayerIdx[i][j] are derived as follows:

```
for( i = 0; i <= vps_max_layers_minus1; i++ ) {
    iNuhLId = layer_id_in_nuh[ i ]
    NumDirectRefLayers[ iNuhLId ] = 0
    for( j = 0; j < i; j++ )
        if( direct_dependency_flag[ i ][ j ] ) {
            RefLayerId[ iNuhLId ][ NumDirectRefLayers[
                iNuhLId ]++ ] =
layer_id_in_nuh[ j ]
            SamplePredEnabledFlag[ iNuhLId ][ j ] = ( (
direct_dependency_type[ i ][ j ] + 1 ) & 1 )
            MotionPredEnabledFlag[ iNuhLId ][ j ] = ( ( (
direct_dependency_type[ i ][ j ] + 1 ) & 2 ) >> 1 )
            ResidualReGenerationEnabledFlag[iNuhLId ][j ]=((
( direct_dependency_type[i ][j ]+1 ) & 4)>>2)
            DirectRefLayerIdx[ iNuhLId ][ layer_id_in_nuh[ j ] ] =
NumDirectRefLayers[ iNuhLId ] − 1            }
}
```

Decoding Process for Residual Dependent Layers

The inventors define embodiments of an additional decoding process for SHVC in addition to existing ones to re-generate the correct transform coefficient levels instead of using the transform coefficient levels parsed in the bitstream (TransCoeffLevels) when both the new ResidualReGenerationEnabledFlag and the existing inter_layer_pred_enable_flag is equal to 1.

Decoding Process for Coding Units Coded in Intra Prediction Mode

If both ResidualReGenerationEnabledFlaq[currLayerId][rLId] and inter layer pred enable flag is equal to 1 the specifications in subclause "Decoding process for coding units coded in intra prediction mode" in HEVC/SHVC specification apply with the exception that prior to "Scaling and transformation process" the transform coefficient levels TransCoeffLevel are modified as specified in "Scaling and transformation process". Otherwise the specification in subclause 8.4 apply.

Decoding Process for the Residual Signal of Coding Units Coded in Inter Prediction Mode If both ResidualReGenerationEnabledFlag[currLayerId][rLId] and inter layer pred enable flag is equal to 1 the specifications in subclause "Decoding process for the residual signal of coding units coded in inter prediction mode" in HEVC/SPEC specification apply with the exception that prior to "Scaling and transformation process" the transform coefficient levels TransCoeffLevel are modified as specified in "Scaling and transformation process". Otherwise the specification in subclause "Decoding process for the residual signal of coding units coded in inter prediction mode" apply.

Scaling, Transformation and Array Construction Process prior to Deblocking Filter Process If both ResidualReGenerationEnabledFlag[currLayerId][rLId] and inter layer pred enable flag is equal to 1 the specifications in subclause "Scaling, transformation and array construction process prior to deblocking filter process" in HEVC/SHVC specification apply with the exception that prior to "Scaling and transformation process" the transform coefficient levels TransCoeffLevel are modified as specified in "Scaling and transformation process". Otherwise 0 the specification on subclause "Scaling, transformation and array construction process prior to deblocking filter process" apply.

NOTE: A transcoder can re-use most layer specific syntax from the current layer including the modified TransCoefflLevel when the ResidualReGenerationEnabledFlag[currLayerId][rLId] is equal to 1 or inter layer pred enable flag is equal to 0 to encode a HEVC version 1 compatible bitstream.

Scaling and Transformation Process

Inputs to this process are:
a luma location (xTbY, yTbY) specifying the top-left sample of the current luma transform block relative to the top left luma sample of the current picture,
a variable trafoDepth specifying the hierarchy depth of the current block relative to the coding block,
a variable cIdx specifying the colour component of the current block,
a variable nTbS specifying the size of the current transform block.
an array of reconstructed samples from the inter-layer reference picture (after de-block and sao) rsPic
an array of prediction samples predSamples Output of this process is the (nTbS)×(nTbS) array of transform coefficient levels with elements TransCoeffLevel [xTbY][yTbY][cIdx][x][y].

First an (nTbS)×(nTbS) array of temporary residual samples (rT) is obtained by taking the difference between rlPicSample and predSamples:

$$rT[x][y] = rIPicSample[x][y] - predSamples[x][y]$$

The (nTbS)×(nTbS) array of levels I is derived as follows:
If cu transquant bypass flag is equal to 1, the (nTbS)×(nTbS) array of levels I is set equal to the (nTbS)×(nTbS) array of temporary residual samples rT $$I[x][y] = rT[x][y].$$

Otherwise, the following ordered steps amply:
1. The forward transform as specified in clause "Transformation process for temporary residual samples" is invoked with the transform block location (xTbY, yTbY), the size of the transform block nTbS, the colour component variable cIdx, the quantization parameter qP, and the array of temporary residual samples rT as inputs, and the output is an (nTbS)×(nTbS) array of forward transform coefficients d.
2. The (nTbS)×(nTbS) array of transform coefficients TransCoeffLevel is modified as follows:
If transform skip flag[xTbY][yTbY][cIdx] is equal to 1, the sample array values TransCoeffLevel [xTbY][yTbY][cIdx][x][y] with x=0 . . . nTbS−1, y=0 . . . nTbS−1 are derived as follows:

TransCoeffLevel $[xTbY][yTbY][cIdx][x][y] = (I[x][y] <<$ (15−bitDepth−log 2(nTbS)) (H 8-267)

Where bitDepth is equal to bitDepth$_Y$ when cIdx is equal to 0 and otherwise equal to bitDepth$_C$.

Otherwise (transform skip flag[xTbY][yTbY][cIdx] is equal to 0), the forward scaling process for transform coefficients as specified in clause "Forward scaling process for forward transform coefficients" is invoked with the transform block location (xTbY, yTbY), the size of the transform block nTbS, the colour component variable cIdx, and the (nTbS)×(nTbS) array of forward transform coefficients d as inputs, and the output is an (nTbS)×(nTbS) array of transform coefficients TransCoeffLevel.

Forward Scaling Process for Forward Transform Coefficients

Inputs to this process are:
a luma location (xTbY, yTbY) specifying the top-left sample of the current luma transform block relative to the too left luma sample of the current picture,
a variable nTbS specifying the size of the current transform block,
a variable cIdx specifying the colour component of the current block,
a variable qP specifying the quantization parameter,
an array of forward transform coefficients d with elements d[x][y]

Output of this process is the (nTbS)×(nTbS) array TransCoeffLevel of transform coefficients with elements TransCoeffLevel[xTbY][yTbY][cIdx][x][y].

The transform coefficients are modified by the following ordered steps:
8. intLevel[x,y] is set equal to d[x,y]
9. intSign[x,y] is set equal to −1 if intLevel[x,y] is less than 0 otherwise it is set to 1.
10. fwdScaleFactor=fwdLevelScale [Qp % 6] where fwdLevelScale={26214, 23302, 20560, 18396, 16384, 14564}
11. int64Level[x,y] is set equal to abs(intLevel[x,y])*fwdScaleFactor
12. intLevel[x,y] is set equal to (int64Level[x,y]+intAdd)>>intQBits where intQBits is equal to 29+Qp/6−bitDepth−log 2(nTbS),
bitDepth is equal to bitDepth$_Y$ when cIdx is equal to 0 and otherwise equal to bitDepth$_C$,
intAdd is equal to 171<<(intQBits−9) if slice type is equal to I or the inter-layer picture rsPic is an RAP, otherwise intAdd is equal to 85<<(intQBits−9)
13. intLevel[x,y] is set equal to intLevel[x,y]*intSign[x,y]
14. TransCoeffLevel[xTbY][yTbY][cIdx][x][y] is set equal to Clip3(−32768, 32767, intLevel[x,y])

Transformation Process for Temporary Residual Samples

General

Inputs to this process are:
a luma location (xTbY, yTbY) specifying the top-left sample of the current luma transform block relative to the top left luma sample of the current picture,
a variable nTbS specifying the size of the current transform block,
a variable cIdx specifying the colour component of the current block,
an (nTbS)×(nTbS) array rT of temporary residual samples with elements rT[x][y].

Output of this process is the (nTbS)×(nTbS) array d of forward transform coefficients with elements d[x][y].

Depending on the values of CuPredMode[xTbY][yTbY], nTbS, and cIdx, the variable trType is derived as follows:

If CuPredMode[xTbY][yTbY] is equal to MODE INTRA, nTbS is equal to 4, and cIdx is equal to 0, trType is set equal to 1.

Otherwise, trType is set equal to 0.

The (nTbS)×(nTbS) array d of transform coefficients is derived as follows:

1. Each (vertical) column of temporary residual samples rT[x][y] with x=0 . . . nTbS−1, y=0 . . . nTbS−1 is transformed to e[x][y] with x=0 . . . nTbS−1, y=0 . . . nTbS−1 by invoking the one-dimensional transformation process as specified in clause "Forward transform process" for each column x=0 . . . nTbS−1 with the size of the transform block nTbS, the list r[x][y] with y=0 . . . nTbS−1, and the transform type variable trType as inputs, and the output is the list of e[x][y] with y=0 . . . nTbS−1.

2. The intermediate sample values g[x][y] with x=0 . . . nTbS−1, y=0 . . . nTbS−1 are derived as follows:
shift1 is equal to log 2(nTbS)−1+bitDepth−8, where bitDepth is equal to bitDepth$_Y$ when cIdx is equal to 0 and otherwise equal to bitDepth$_C$ $$q[x][y]=(e[x][y]+(1<<(shift1-1)))>>shift1$$

3. Each (horizontal) row of the resulting array g[x][y] with x=0 . . . nTbS−1, y=0 . . . nTbS−1 is transformed to h[x][y] with x=0 . . . nTbS−1, y=0 . . . nTbS−1 by invoking the one-dimensional transformation process as specified in clause "Forward transform process" for each row y=0 . . . nTbS−1 with the size of the transform block nTbS, the list g[x][y] with x=0 . . . nTbS−1, and the transform type variable trType as inputs, and the output is the list h[x][y] with x=0 . . . nTbS−1.

4. The forward transform coefficients d are derived as follows:
shift2 is equal to log 2(nTbS)+8

$$d[x][y]=(h[x][y]+(1>>(shift2-1)))>>shift2$$

Forward Transformation Process

Inputs to this process are:
a variable nTbS specifying the sample size of the residual samples,
a list of transform coefficients x with elements x[i], with i=0 . . . nTbS−1.
a transform type variable trType Output of this process is the list of transformed samples y with elements y[i], with i=0 . . . nTbS−1.

Depending on the value of trType, the following applies:
If trType is equal to 1, the following transform matrix multiplication applies:

$$y[I] = \sum_{j=0}^{nTbS-1} transMatrix[j][i]*x[j] \text{ with } I = 0 \ldots nTbS-1$$

where transform coefficient array transMatrix is defined in HEVC/SHVC specification in Equation H 8-277.

Otherwise (trType is equal to 0), the following transform matrix multiplication applies:

$$y[I] = \sum_{j=0}^{nTbS-1} transMatrix[j*2^{5-Log2(nTbS)}][i]*x[j] \text{ with}$$

$I = 0 \ldots nTbS-1, y[i] = \text{with } i = 0 \ldots nTbS-1,$ where the transform coefficient array transMatrix is specified in HEVC/SHVC specification in Equations H 8-279 and H 8-281.

The effect of the coding according to the current disclosure when compared to SHVC, simulcast and full transcoding is indicated below.

SHVC, simulcast and full transcoding all uses RDOQ and sign data hiding whereas the proposal use that for layer 0 but not layer 1.

Low Delay Configuration:
−11.6% (+1.5% vs SHVC) compared to simulcast, 0% compared to high fidelity (SHVC 24.3% loss), 8.7% loss compared to low fidelity and SHVC (full transcoding has +12.9%)

Random-access Configuration:
−12.9% (+10.3% vs SHVC) compared to simulcast, 0% compared to high fidelity (SHVC 14.4% loss), 10.4% loss compared to low fidelity and SHVC (full transcoding has +12.1%)

The inventors have thus shown how SHVC can provide a high fidelity bitstream in the downlink with same performance as version 1 HEVC and also compliant with version 1 HEVC. Low fidelity layers make use of the high fidelity base layer in the uplink to reduce overhead compared to simulcast. To reconstruct a low fidelity layer the residual is re-generated from the high fidelity layer. A transcoder can use this SHVC bitstream to derive a low fidelity bitstream with better coding efficiency than could be achieved from transcoding and without mode and motion estimation. There are no syntax changes below VPS.

Descriptions of exemplary alternatives of transcoders are disclosed below. What is specified here applies both to an encoder and a decoder since the encoder typically needs to perform same decoding process as the decoder. The alternatives are described in the context of SHVC as an example but apply also to HEVC and scalable and non-scalable video/image coding approaches in general.

Alternative 1

Alternative 1 relates to the description above, with reference to FIGS. 7-8, and the VPS (video parameter set) extension and decoding process.

It can be noted that the descriptions use the inter-layer reference picture for the generation of the residual. Another approach would be to define that the reconstruction after in-loop filtering of layer 0 is used. Those pictures are typically the same. In this case it is not needed to send any inter-layer reference picture indication in the RPS (reference picture set). This would make a higher layer more similar to HEVC version 1 and will not need to modify the RPS and neither need to modify the reference index, in case the inter-layer reference picture not is in the last position of the reference picture list, or modify the slice type when the inter-layer reference picture is intra coded, when transcoding to a single layer bitstream.

It can also be noted that the FIGS. 7-8 indicate that the motion from layer 0 is made available for the prediction P. If such information not is used it does not need to be made available.

It can also be noted that FIGS. 7-8 indicate that transform and inverse transform is used. If the block or bitstream is indicated to not use transform, both transform and inverse transform can be omitted. Example of this is also described in the decoding process of the proposal with respect to transform skip transform_skip_flag. If loss-less coding is used transform, quantization, inverse quantization and inverse transform shown in the figures can also be omitted.

An example of this is described in the decoding process of the proposal with respect to cu_transquant_bypass_flag.

Alternative 2

According to a further alternative, the side information includes a specification of the specific dependency between layers and the decoding process for the additional transform and quantization in a SEI (supplementary enhancement information) message for SHVC. One example for the dependency is shown in VPS extension in alternative 1 and one example of decoding process using the dependency information is shown in the decoding process in alternative 1. When a decoder receives the SEI message it will know how to decode the higher layers of the scalable bitstream by using the reference layer to get an encoder/decoder match (identical reconstructed pixel values) for higher layers.

Alternative 3

According to another alternative, the side information includes a specification of the specific dependency between layers and the decoding process, for the additional transform and quantization, for an auxiliary picture to SHVC. One example for the dependency is shown in VPS extension in alternative 1 and one example of decoding process using dependency information is shown in the decoding process in alternative 1. When a decoder receives the auxiliary picture it will know how to decode it by using the reference layer of the bitstream to get an encoder/decoder match (identical reconstructed pixel values) for higher layers.

Alternative 4

One can also specify a new scalability type to make it easier for decoders to understand that the bitstream use residual re-generation, additional decoding process for transform and quantization. One example is to add it on top of alternative 1.

scalability_mask_flag[I] equal to 1 indicates that dimension_id syntax elements corresponding to the i-th scalability dimension in Table 2 below are present. scalability_mask_flag[I] equal to 0 indicates that dimension_id syntax elements corresponding to the i-th scalability dimension are not present.

TABLE 2

Mapping of ScalabiltyId to scalability dimensions

| scalability mask index | Scalability dimension | ScalabilityId mapping |
|---|---|---|
| 0 | Reserved | |
| 1 | Multiview | View Order Index |
| 2 | spatial/SNR scalability | DependencyId |
| 3 | Spatial/SNR scalability intended for transcoding | DependencyId |
| 4-15 | Reserved | |

This can for example be signalled as side information in VPS.

Alternative 5

Alternative 1 is mainly specified for SNR scalability. If the resolution in the reference picture (layer 0) is larger than in the current picture (e.g. layer 1) it is needed to define a down-sampling process and specify which filter coefficients that should be used. The down-sampling is applied on the high resolution output before it is used in the residual re-generation of the low resolution.

One approach to do this is to modify the resampling process in SHVC such that alternative filters are used if the resolution is lower in the enhancement layer than in the reference layer when generating the inter-layer reference picture. One example for 0.5× scalability is to only modify the luma and chroma filters for the full-pel position (phase 0) so that they corresponds to a low-pass filter and not an all-pass filter (dirac) as they currently are defined.

With respect to SHVC it is then required to modify the Resampling process for inter layer reference pictures so that the resampling if performed when ResidualReGeneration-Flag[curLayer][rId] is 1:

Resampling Process for Inter Layer Reference Pictures

When SamplePredEnabledFlag[currLayerId][rLId] or ResidualReGenerationFlag[currLayerId][rLId] is equal to 1, the picture sample resampling process is invoked with the sample arrays of reference layer picture rlPic as input, and with the sample arrays of resampled picture rsPic as output.

Which filter coefficients to use can be signaled in the VPS, SPS, PPS or slice level or alternatively in an SEI message or defined for a new auxiliary picture type. The decoder can then use the information to be able to do appropriate down-sampling of the high resolution before using it for the decoding of the low resolution.

Alternative 6

In some of the previous alternatives, the parsed/decoded transform coefficients are overwritten or refined by an additional decoding process (transform and quantization).

It can be indicated as side information in the bitstream which color component it applies for. For example, if it applies to luma or respective chroma channel or to all color components. Then the "normal" decoding process is only pre-processed by the additional transform and quantization for the color components it is indicated to be applied for.

This can be signalled as side information on VPS, SPS, PPS, slice header level or coding unit level, or alternatively in an SEI message.

The above-described embodiments and alternatives may be utilized in an encoder or decoder arrangement in order to support the also described transcoding method and arrangement. The encoding and/or decoding arrangements and methods enable generating encoding the video bitstream and generate the side information necessary for decoding the encoded video bitstream.

Figure 10:
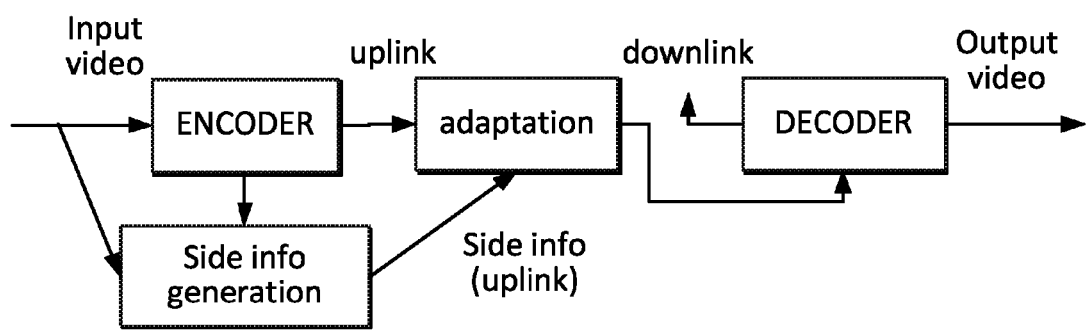
FIG. 10-11 illustrate schematically aspects of the embodiments of the present invention.

With reference to FIG. 10, it is schematically illustrated that a video bitstream is encoded in an encoder and side information pertaining to the video bitstream is generated. Both the encoded video bitstream and the generated side information are transmitted over the uplink to an adaptation node in which the video bitstream is adapted. The adapted video bitstream is subsequently transmitted over the downlink and received in a decoder where it is decoded into an output video bitstream. FIG. 10 shows the general block diagram of the proposed system when applied to an adaptation process. The encoder is typically a non-scalable video encoder, such as a HEVC Main profile encoder. Additionally, side information is generated, based on input from the input video and from the encoder.

The generated side information is sent in addition to the main encoded video bitstream, i.e. through the uplink. The bit rate used for the transmission of side information is typically much lower than the bit rate of the main video data, e.g. in the order of 10% of the main video data (see below for a more detailed performance discussion). The side information may be transmitted separately from the main video data, e.g. through a different physical or logical channel. However, typically the side information is transmitted interleaved with the main video data. One way of sending the side information is to use HEVC supplemental enhancement information messages (SEI) interleaved in the main bitstream. Another way is to use other HEVC NAL units (network adaptation layer), that may be distinguished from the main bitstream e.g. by the value of nuh_layer_id in the NAL unit header, similar to how scalable video layers are distinguished in SHVC.

The side information is provided to the adaptation node, in addition to the main video data, and then utilized by the adaptation node in the adaptation process.

Figure 11:
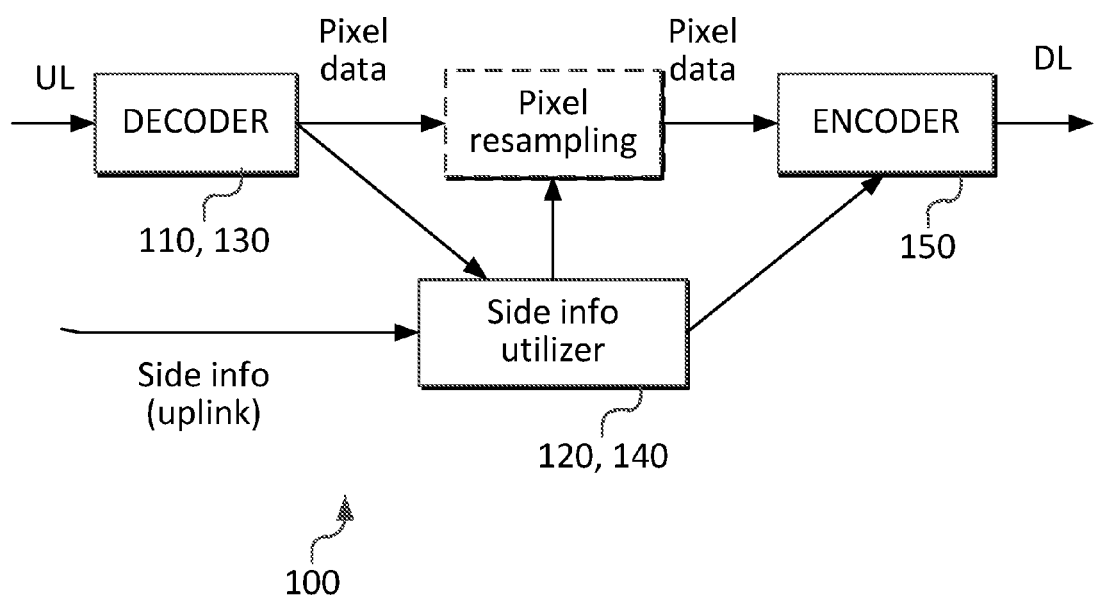

A transcoder, e.g. according to FIG. 11, can then use this information to speed up transcoding to one of the lower resolutions partly coded in the scalable bitstream, as follows:

In order for the side info generation to perform efficient RDO, it needs to have exact knowledge of the operations performed in the adaptation node, e.g. filters used for pixel and/or motion resampling, and operations performed in the encoder stage of the transcoder (motion-compensated reconstruction including motion compensated prediction, intra prediction, transform, quantization, reconstruction, loop filtering, etc.), i.e. how the side information is actually applied in the encoder stage of the transcoder. One option for the side information generation to have that knowledge is that the side information generation and transcoder would be provided as a "closed solution", i.e. by a single vendor providing the complete solution. Another option would be that some or all of the operation of the transcoder would be standardized in a standard specification, such as an appendix to the HEVC specification.

As an example using HEVC, the embodiment can be performed by an encoder by the following steps:

1. The encoder or another entity uses down sampling to construct pictures of lower resolutions. The down sampling method needs to be agreed between encoder and adaptation node, preferably standardized.
2. The encoder encodes the highest resolution picture and outputs a bitstream that is compliant to the HEVC video coding standard. The block structure, block modes, intra modes, motion vectors, and reference pictures used for motion compensation are stored.
3. The encoder encodes each picture of lower resolution by deciding on block structure and performing motion estimation and mode selection for all the blocks in the picture. Side information is generated that may include the following:
   a. Block partition sizes for coding units (CUs), prediction units (PUs), and transform units (TUs). These may be encoded with or without predicting the sizes from a higher resolution pictures. For instance, if the higher resolution choses a 64×64 coding unit for a particular block and the lower resolution is 2× smaller, resolutions 32×32 and 64×64 are made cheaper than other block sizes as they are expected to be more likely to occur for the corresponding picture area. Likewise, if the transform size is 8×8, the transform sizes 8×8 and 4×4 are made cheaper than other transform sizes. This can for example be realized by including block sizes from the corresponding higher resolution into the CABAC context when coding the block sizes of the current resolution. Here and in this document, including certain information into the CABAC context is to be understood as selecting a CABAC context based on that information.
   b. Block modes for the coding units. Again, they may be encoded with or without predicting from a higher layer. If predicted, the block mode of the corresponding picture area of a higher layer is used for predicting the mode of the current block. For instance, if the corresponding block(s) in the higher resolution picture is Intra coded, Intra mode is made cheaper for the lower resolution block. As with block sizes, the prediction can be realized by including co-located block modes into the CABAC context when coding the mode.
c. Intra prediction mode for the blocks whose mode is Intra, either predicted from higher quality layer or not, similar to what is described above.
d. Motion vector and reference picture for motion compensation for the blocks whose mode is Intra, either predicted from higher quality layer or not, similar to what is described above. Prediction of motion vectors can be realized by including information about the higher quality layer motion vectors into the CABAC context for coding the motion vectors in the lower quality layer, or prediction of motion vectors by means of predictive motion vector coding using techniques such as adaptive motion vector prediction (AMVP) or temporal motion vector prediction (TMVP), where a motion vector predictor would be derived based on the motion vectors in the higher quality layer, and when coding the lower quality layer motion vector, the difference between the actual lower quality vector and the motion vector predictor is coded.
e. Quantization parameter for all blocks
f. SAO parameters for the picture, either predicted from higher quality layer or not, similar to what is described above.

The selection of side information a-f above can be performed by employing rate-distortion optimization (RDO) techniques. In such techniques, typically, the impact of coding mode or parameter decisions is evaluated by considering the impact of the decision on both the resulting video distortion after reconstructing the video (D) and the bit rate required for coding (R). Here, D is typically a function of the reconstructed video and the corresponding original (undistorted) video, e.g. a mean-square error (MSE) or signal-to-noise ratio (SNR) or peak-signal-to-noise ratio (PSNR). The impact of both D and R is typically considered by minimizing a cost function D+lambda*R, i.e. a weighted sum of distortion and bit rate, using a weighting factor lambda. The cost function is typically evaluated for several different parameter choices, and then the choice that minimizes the cost function is selected by the encoder. In the case of side information coding, the distortion $D_{transcoded}$ to consider is the distortion that would be observed after using the side information in the transcoding process and then decoding the transcoded video. Furthermore, two bit rates may be considered, the bit rate required to code the side information in the uplink (i.e. when sending the video from the encoder to the transcoder), $R_{sideinformation}$, and the bit rate required to represent the video after transcoding, $R_{transcoded}$. If the side information is coded independent of the high quality video, then the side information may be used as-is in the transcoded video, thus $R_{sideinformation}$ could be considered to have a direct linear contribution in $R_{transcoded}$, in which case $D_{transcoded}$+lambda*$R_{sideinformation}$ can be used as cost function. If the side information is coded with dependence on the high quality video, then no such relationship between $R_{sideinformation}$ and $R_{transcoded}$ may exist, and the two rates may be considered through separate terms in a cost function such as $D_{transcoded}$+lambda$_{sideinformation}$*$R_{sideinformation}$+lambda$_{transcoded}$*$R_{transcoded}$, using two weighting factors lambda$_{sideinformation}$ and lambda$_{transcoded}$.

4. The encoder reconstructs the lower resolution picture by using the sizes/modes/vectors/QP/SAO that was sent in the side information:
   a. Constructing residual blocks by applying the block mode and either Intra prediction mode or motion vector and reference picture depending on whether the block is Intra or Inter.
   b. Quantizing the residual blocks according to a known quantization method. Note that quantization methods are generally not standardized so this method needs to be agreed between encoder and adaptation node or standardized (preferred).
   c. Inverse quantize the block, add it to the prediction and form the reconstructed block according to the HEVC specification.
   d. Apply de-blocking filter and SAO for the picture. The reconstructed picture will now be bit-exact to what a decoder decoding the stream after the adaptation node will decode.

Following the same example, these steps may be performed by an adaptation node to generate a single layer low-resolution bitstream from the incoming high resolution bitstream and side information:

1. Decode the high-resolution bitstream. Store block structure, block modes, intra modes, motion vectors and reference pictures used for motion compensation.
2. The high-resolution picture is down sampled by using the agreed/standardized down sampling method.
3. The adaptation node decodes the block sizes, block modes, intra prediction modes, motion vectors, and reference pictures for motion compensation, quantization parameter, and SAO parameters from the side information bitstream. Note that some of all of these parameters may be predicted from parameters stored during decoding of the high-resolution bitstream. These decoded parameters are included in the output bitstream.
4. For each block, the block size, modes (including Intra and Inter modes and parameters), and QP are used to form residual blocks. These residual blocks are then quantized according to the known quantization method described above. The resulting coefficients are included in to the output bitstream.
5. Inverse quantize each block, add it to the prediction and form the reconstructed block according to the HEVC specification.
6. Apply de-blocking filter and SAO for the picture. The reconstructed picture will be bit-exact to the result of decoding the output stream. The output stream will be a compliant single layer HEVC stream.

The adaptation steps 4 and 5 above may have to be performed on a per-block level, such that when reconstruction a block in step 5, the result of the reconstruction process of previously decoded blocks in the same picture are taken into account. That is typically the case when intra-prediction modes are used, since those generate the prediction signal based on decoded pixels in the block neighborhood. It may be desirable to avoid such per-block processing since it may be simpler to re-use existing decoder implementations for implementing the new scheme when the decoding process is only affected on a picture level. This can be realized for a given picture when no intra predicted blocks are used.

Alternatively, it can be realized when prediction for intra-predicted blocks based on reconstructed inter-predicted blocks is disabled, which is called "constrained intra prediction", and additionally, any prediction between intra-predicted blocks is avoided, e.g. by avoiding placing intra-coded blocks next to each other. An encoder has the choice to fulfill such constraints. However in order for the transcoder or decoder to make use of that fact, such as to perform only picture level processing, e.g. using existing transcoder or decoder implementations, the transcoder, or decoder needs to be aware that such constraints have been fulfilled by the encoder. Thus the encoder may signal that it has followed such constraints, e.g. by using a flag or indicator that indicates whether the constraints have been fulfilled or not. If the transcoder or decoder receives the flag and the flag indicates that the constraints have been fulfilled, it can perform picture-level processing or, alternatively, block-level processing. If the transcoder or decoder receives the flag and the flag indicates that the constraints have not been fulfilled, the transcoder or decoder can perform block-level processing, or if it does not support using block-level processing, it can indicate that it cannot decode the video.

An advantage with the guided transcoding architecture above is that compared to known transcoding architectures such as depicted in FIG. 2, the additional side information can provide optimized mode/motion information to the encoding stage of the transcoder such that very high compression efficiency can be achieved for the transcoded bitstream while the encoding stage in the transcoder does not have to include mode/motion estimation, which is typically the major reason for high transcoding complexity. It can be noted that since the side information generation is located at the sender side of the system, it can utilize original video data for generation of the low-resolution mode/motion information, unlike what conventional transcoders according to FIG. 2 could do since they have only the compressed bitstream available. Compared to conventional transcoding, the availability of original video data for utilization in mode/motion optimization allows the proposed system to achieve slightly better compression efficiency of the transcoded bitstream, i.e. a slightly better downlink bandwidth utilization.

Figure 12:
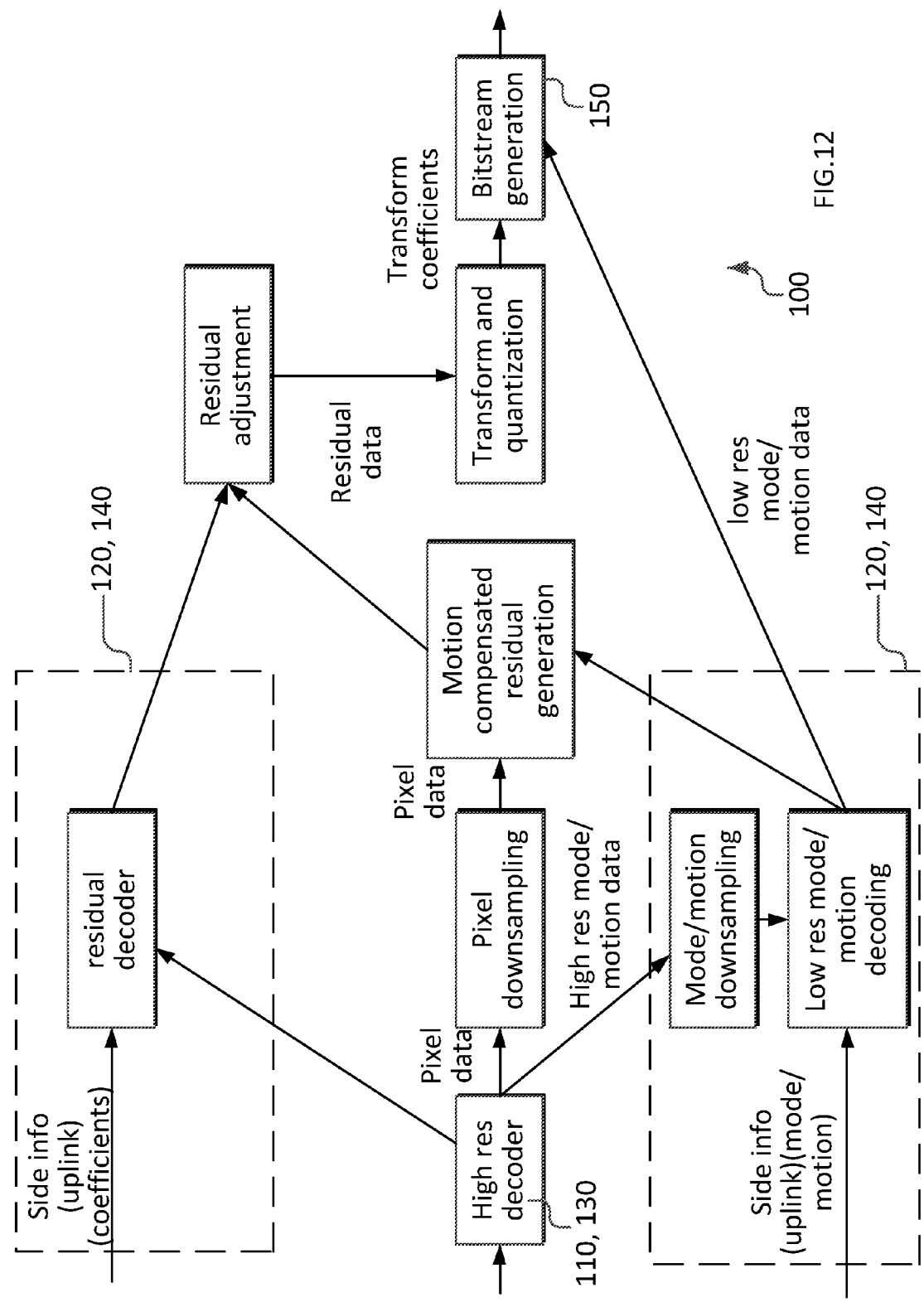
FIG. 12 illustrates an example of the multiple usage of the side information.

An example of the multiple usage of the side information will be described with reference to FIG. 12, in which guided transcoding with side information is performed for residual refinement. As illustrated in FIG. 12, the side information comprises both mode/motion information (illustrated at the bottom of FIG. 12) and coefficient information for the low-resolution video (illustrated at the top of FIG. 12). Both types of side information are preferably interleaved (not illustrated) in a single stream transmitted on the uplink, e.g. using different NAL units distinguished by NAL unit type of layer identifier.

Although illustrated as two separate side information inputs and two side information utilization units 120, 140, it is equally possible to have a single side information utilization unit 120, 140 enabling the reception of two separate side information bit streams interleaved into a single side information bit stream.

The low-resolution coefficient data may contain prediction residual data as in conventional single layer video or scalable video. It may be coded with dependency on the down-sampled high-resolution pixel data, then using similar prediction mechanisms as in scalable coding (e.g. SHVC), with the difference that a down-sampling operation is involved for inter-layer prediction. The output of the "residual decoder" is low-resolution residual data. The "residual decoder" may reconstruct the low-resolution residual data without performing motion-compensated reconstruction mechanisms.

The encoder stage of the transcoder comprises motion-compensated residual generation, followed by residual adjustment (the result being adjusted residual data), transform coefficients (the result being transform coefficients and bitstream generation). The motion-compensated residual generation uses main video pixel data down-sampled to the target resolution as input data, and the motion compensated residual generation is performed by utilizing the low-resolution mode/motion data received as side information (that data is optionally encoded dependent on the down-sampled mode/motion data from the main video). In the residual adjustment stage, the residual data generated in the motion-compensated residual generation is adjusted based on the low-resolution residual data decoded by the residual decoder. The residual adjustment operation could for example include adding the two residual signals, or subtracting them from each other. The resulting adjusted residual data is transformed, quantized, and entropy coded together with the low resolution mode/motion data.

Note that alternatively to the example depicted in FIG. 12 adjustment operations similar to the residual adjustment operation could also be performed on the pixel data that is input to the motion-compensated residual generation or on the transform coefficients that are output from the transform and quantization stage.

Note that although not indicated in the FIG. 12, the side information utilizer in this example could also control the transform and quantization stage, and the residual adjustment stage.

As indicated above the side information can comprise residual information related to the predetermined input video format, as well as or alternatively search ranges of coding parameters to further enhance the transcoding. The side information and the encoded video bitstream can be transmitted together as an interleaved bitstream, or in separate layers within a single carrier, or in separate carriers or channels. In order to enable the receiving transcoding arrangement 100 to utilize the provided side information, optionally an indication of the provided side information as well as optionally an indication of the potential use of the provided side information is transmitted to and received by the transcoding node. Consequently, the transcoder arrangement 100 comprises an indication identification unit operable to detect the presence of such an indication and how to interpret the provided side information.

As mentioned above, the side information may contain mode/motion information and/or transform coefficients related to potential target output resolutions or target output operation points of a guided transcoder. It may also contain information about parameters for pixel resampling and/or motion resampling (e.g. filters used), loop-filter parameters for a target output resolution (e.g., de-blocking parameters or SAO, sample adaptive offset, parameters), quantization parameters to be used in the encoding stage of the transcoder, or other encoding parameters. The parameters in the side information can be coded with dependency on related parameters in the main video bitstream, e.g. differential coding can be applied, similar to scalable coding.

The adaptation methods mentioned above can be varied over time, e.g., different methods may be applied for different pictures in the video. Accordingly, the type and amount of side information may vary. For instance, side information for guided transcoding may be sent for some pictures, whereas no side information may be sent for some other pictures (e.g. non-reference pictures). Using such variations, a trade-off between the amount of side information transmitted and the transcoding complexity can be selected.

Figure 13:
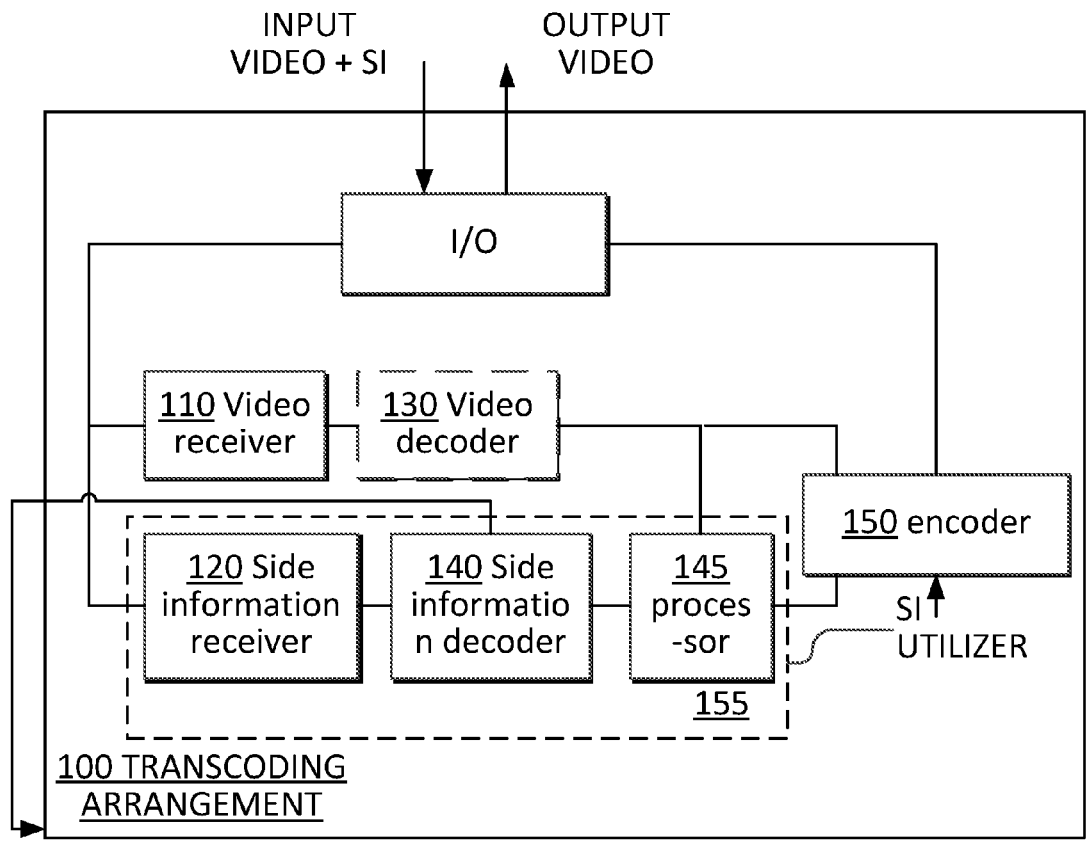
FIG. 13 illustrates schematically a transcoding arrangement according to an embodiment of the present invention.

With reference to FIG. 13, a general embodiment of a transcoder arrangement 100 for transcoding a video bitstream according to an embodiment will be described. The arrangement is adapted, configured, or operable to perform all functions as described with reference to the previously described block or flow charts of the embodiments of the transcoding method.

The transcoding arrangement is configured to receive the bitstream with the input video format, wherein the input video format is a high fidelity format and to receive side information related to said video bitstream. The side information comprises at least:
- a video bitstream representing the original video source with a low fidelity input video format,
- coding parameters optimized based on knowledge of the original video source;
- transform coefficients, indicative of a residual between the original video source and a decoded version of the high fidelity format.

The transcoder arrangement is further configured:
- to decode said received side information to generate transcoding guiding information,
- to estimate a representation of said bitstream with a low fidelity output format based on the received bit stream and the generated transcoding guiding information, and
- to add the transform coefficients of the side information to transform coefficients generated from the estimated representation of said bitstream with a low fidelity output format to improve the estimation representation of said bitstream with a low fidelity output format. The transcoder is further configured to encode the improved estimation of the representation of said bitstream with a low fidelity output format.

According to an embodiment, the residual between the original video source and a decoded version of the high fidelity format is a quantized residual.

The transcoder arrangement may further be configured to decode said received video bitstream to provide pixel data as said representation of said received video bitstream. Moreover, said side information may further comprise residual information related to said predetermined input video format.

The transcoder arrangement may further be configured to receive said side information separately from said video bitstream or together with said video bitstream.

According to a further embodiment, the transcoder arrangement is further configured to identify an indication about the presence of said side information within said video bitstream. Said predetermined input video format and said predetermined output video format may comprise different color representations of a video, or different video codecs.

The transcoding arrangement 100 can be implemented in a network node (fixed or wireless), such as a base station node or a video provider node, or in a user equipment, such as a mobile phone or laptop or similar.

According to one aspect as illustrated in FIG. 13, the transcoding arrangement comprises a video receiver 110 configured to receive the bitstream with the input video format and a side information receiver 120 configured to receive the side information related to said video bitstream.

The transcoder arrangement further comprises a video decoder 130 to decode the bitstream and a side information decoder 140 configured to decode said received side information to generate transcoding guiding information. The transcoder arrangement comprises a processor 145 configured to estimate a representation of said bitstream with a low fidelity output format based on the received bit stream and the generated transcoding guiding information, and to add the transform coefficients of the side information to transform coefficients generated from the estimated representation of said bitstream with a low fidelity output format to improve the estimation representation of said bitstream with a low fidelity output format. The side information receiver 120, the side information decoder 140 and the processor 145 are denoted as Side Information (SI) utilizer 155.

The transcoder arrangement further comprises an encoder 150 configured to encode the improved estimation of the representation of said bitstream with a low fidelity output format.

Figure 14:
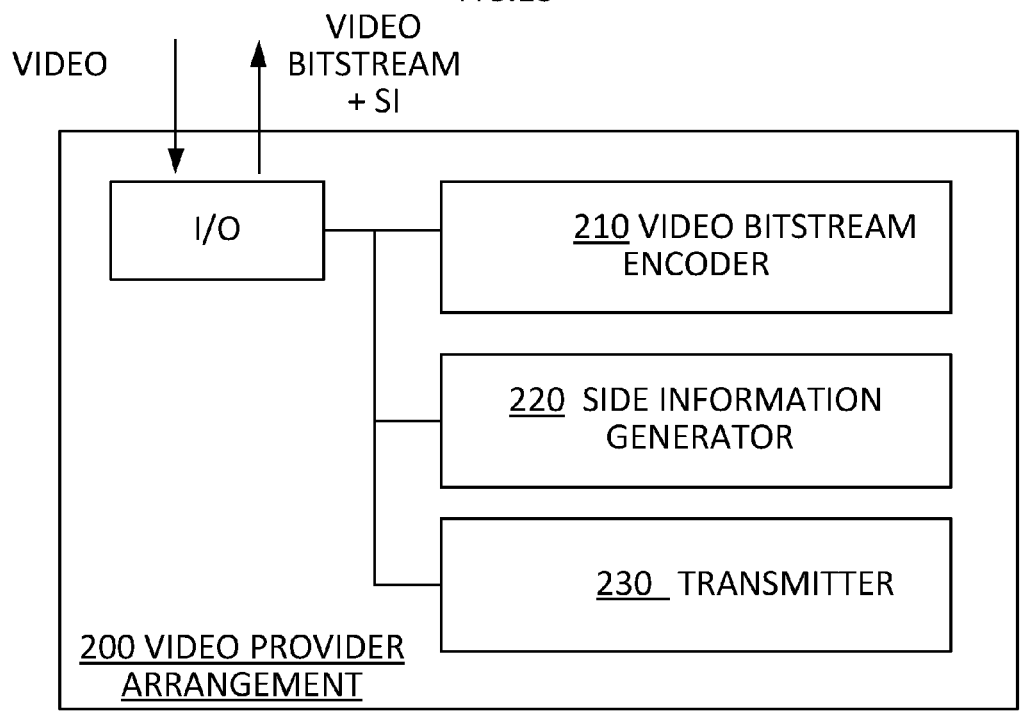
FIG. 14 illustrates schematically a video provider arrangement according to an embodiment of the present invention.

With reference to FIG. 14, a video provider arrangement 200 will be described. The video provider arrangement 200 is beneficially configured to operate and enable the encoding according to the previously described embodiments in order to support the guided transcoding as described above.

The video provider arrangement 200 comprises a video bitstream encoder 210 for encoding the bitstream and a side information generator 220 for generating the side information. Further, the video provider transmitter 230 for sending the bitstream with the input video format, wherein the input video format is a high fidelity format and for sending side information related to said video bitstream. The side information comprising at least:
- a video bitstream representing the original video source with a low fidelity input video format,
- coding parameters optimized based on knowledge of the original video source;
- transform coefficients, indicative of a residual between the original video source and a decoded version of the high fidelity format.

The video provider arrangement 200 can be included in a network node or a user equipment.

Figure 15:
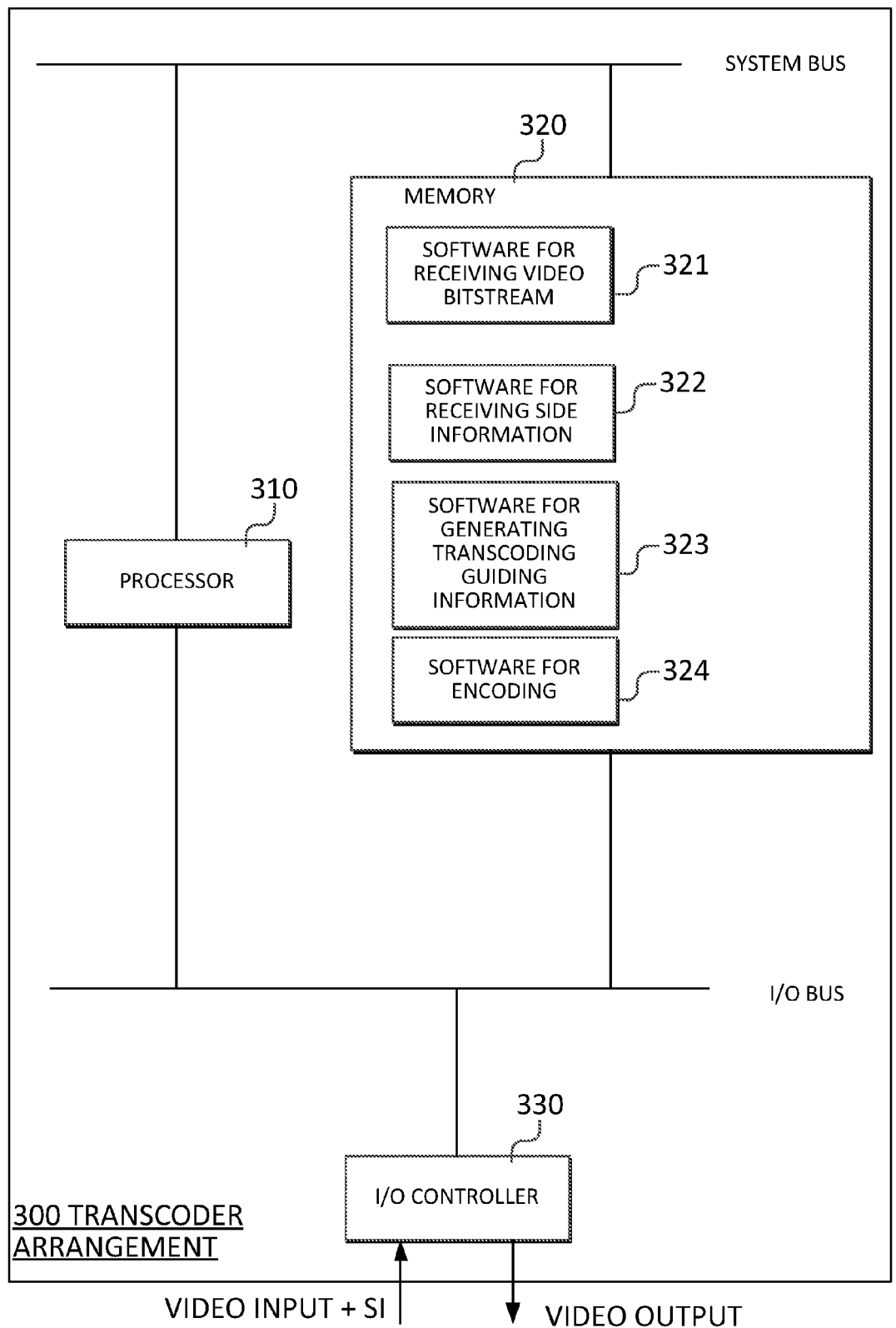
FIG. 15 is an illustration of an implementation of a transcoding arrangement according to the present invention.

In the following, an example of an implementation of a transcoder arrangement 300 will be described with reference to FIG. 15. The transcoder arrangement 300 comprises processing circuitry such as one or more processors 310 and a memory 320. In this particular example, at least some of the steps, functions, procedures, modules and/or blocks described above are implemented in a computer program, which is loaded into the memory for execution by the processing circuitry. The processing circuitry and memory are interconnected to each other to enable normal software execution. The memory 320 may comprise different software modules, such as software for receiving video bitstream 321, software for receiving side information 322, software for generating transcoding guiding information 323 and software for encoding 324. An optional input/output device 330 may also be interconnected to the processing circuitry and/or the memory to enable input and/or output of relevant data such as input parameter(s) and/or resulting output parameter(s).

Figure 16:
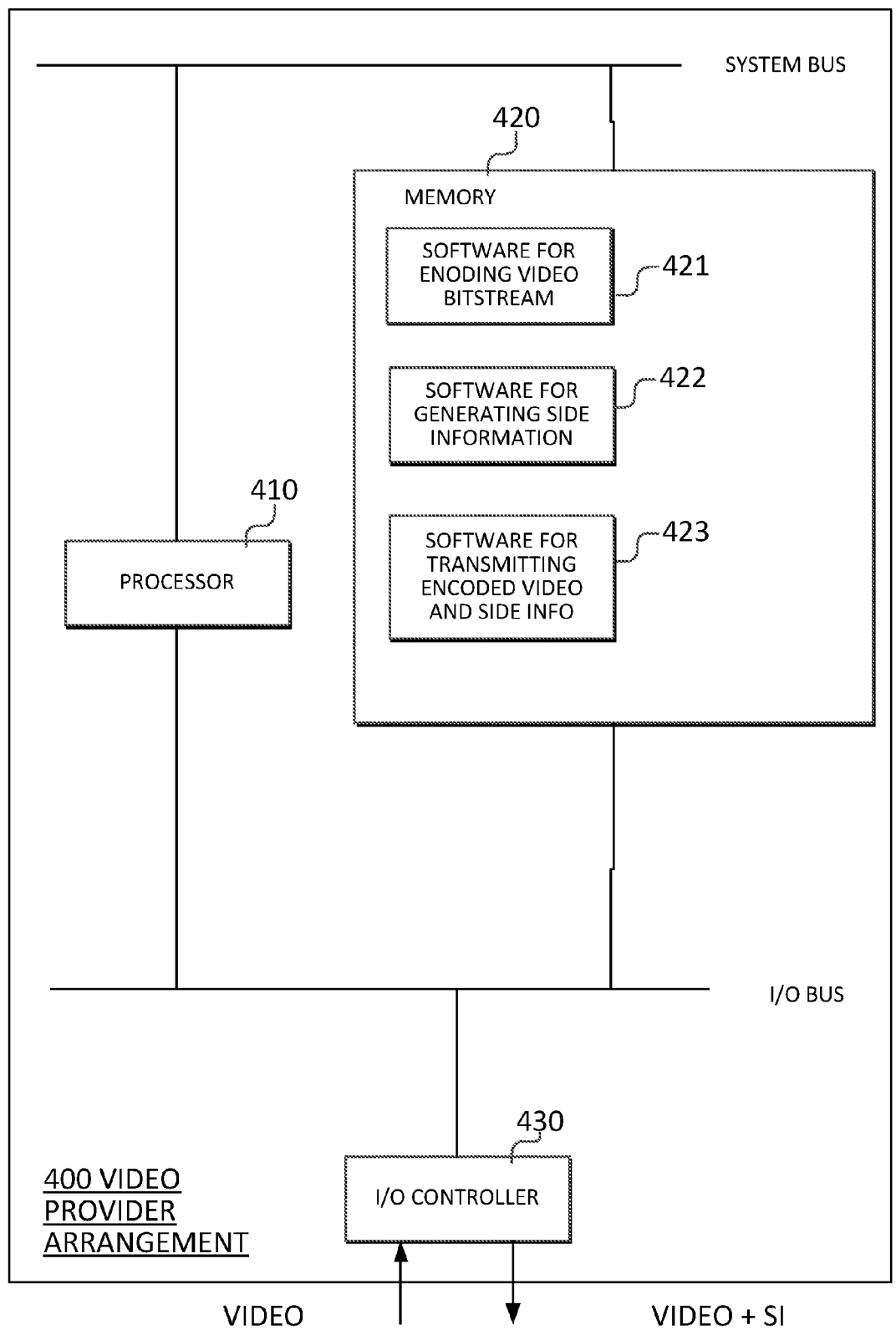
FIG. 16 is an illustration of an implementation of a video provider arrangement according to the present invention.

In the following, an example of an implementation of a video provider arrangement 400 will be described with reference to FIG. 16. The transcoder arrangement 400 comprises processing circuitry such as one or more processors 410 and a memory 420. In this particular example, at least some of the steps, functions, procedures, modules and/or blocks described above are implemented in a computer program, which is loaded into the memory for execution by the processing circuitry. The processing circuitry and memory are interconnected to each other to enable normal software execution. The memory 420 may comprise different software modules, such as software for encoding video bitstream 421, software for generating side information 422, software for transmitting encoded video and side information 423. An optional input/output device 430 may also be interconnected to the processing circuitry and/or the memory to enable input and/or output of relevant data such as input parameter(s) and/or resulting output parameter(s).

The term 'computer' should be interpreted in a general sense as any system or device capable of executing program code or computer program instructions to perform a particular processing, determining or computing task.

In a particular embodiment, the computer program comprises program code which when executed by the processing circuitry or computer causes the processing circuitry or computer to perform the steps and functions as described with reference to the above-described embodiments of a transcoding method and a video providing method.

The program code may be organized as appropriate functional modules configured to perform, when executed by the processing circuit, at least part of the steps and/or tasks described above.

The software or computer program may be realized as a computer program product, which is normally carried or stored on a computer-readable medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Universal Serial Bus, USB, memory, a Hard Disk Drive, HDD storage device, a flash memory, or any other conventional memory device. The computer program may thus be loaded into the operating memory of a computer or equivalent processing device for execution by the processing circuitry thereof.

For example, the computer program stored in memory includes program instructions executable by the processing circuitry, whereby the processing circuitry is able or operative to execute the above-described steps, functions, procedure and/or blocks.

The video provider and the transcoding arrangement as well as the encoding and decoding arrangements therein are thus configured to perform, when executing the computer program, well-defined processing tasks such as those described above.

The computer or processing circuitry does not have to be dedicated to only execute the above-described steps, functions, procedure, and/or blocks, but may also execute other tasks.

Guided transcoding according to the embodiments can thus be a viable alternative for environments where otherwise simulcast would be employed (e.g. video on demand distribution or video conferencing), providing uplink savings at moderate adaptation complexity. It may also provide a viable alternative for environments where otherwise scalable coding would be employed (e.g. video conferencing), providing both uplink and downlink savings as well as decoding complexity savings, at the cost of moderate adaptation complexity. It may also provide a viable alternative for environments where otherwise conventional transcoding would be employed (e.g. video on demand distribution), providing lower adaptation complexity than conventional transcoding in particular if highly efficient encoding (with N>>1) is used, at the cost of increased encoding complexity and slightly increased uplink bit rate. Reducing adaptation complexity may be particularly relevant in scenarios with a single sender and many adaptation nodes (e.g. video on demand distribution).

It will be appreciated that the methods and devices described above can be combined and re-arranged in a variety of ways.

For example, embodiments may be implemented in hardware, or in software for execution by suitable processing circuitry, or a combination thereof.

The steps, functions, procedures, modules, and/or blocks described above may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, and/or blocks described above may be implemented in software such as a computer program for execution by suitable processing circuitry including one or more processing units.

The flow diagram or diagrams presented above may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

Although the embodiments of the current disclosure are described in the context of a network node as a source, an adaptation node and a user equipment as a sink, it equally applicable that the adaptation or transcoding takes place in a user equipment or a base station node.

The invention claimed is:

1. A method for a transcoder arrangement of transcoding a bitstream representing an original video source from an input format to an output format, comprising
receiving the bitstream with the input video format, wherein the input video format is a high fidelity format;
receiving side information related to said video bitstream, said side information comprising at least: a video bitstream representing the original video source with a low fidelity input video format, coding parameters optimized based on knowledge of the original video source, and transform coefficients indicative of a residual between the original video source and a decoded version of the high fidelity format;
decoding said received side information to generate transcoding guiding information;

estimating a representation of said bitstream with a low fidelity output format, based on the received bit stream and the generated transcoding guiding information adding the transform coefficients of the side information to transform coefficients generated from the estimated representation of said bitstream with the low fidelity output format, to improve the estimated representation of said bitstream with the low fidelity output format; and encoding the improved estimated representation of said bitstream with the low fidelity output format.

2. The method according to claim 1, wherein the residual between the original video source and a decoded version of the high fidelity format is a quantized residual.

3. The method according to claim 1, further comprising decoding said received video bitstream to provide pixel data as said representation of said received video bitstream.

4. The method according to claim 1, wherein said side information further comprises residual information related to said input video format.

5. The method according to claim 1, wherein said side information is received separately from said video bitstream.

6. The method according to claim 1, wherein said side information is received together with said video bitstream.

7. The method according to claim 1, further comprising identifying an indication about the presence of said side information within said video bitstream.

8. The method according to claim 1, wherein said input video format and said output video format comprise different color representations of a video, or different video codecs.

9. A transcoder arrangement for transcoding a bitstream representing an original video source from an input format to an output format, wherein said transcoder arrangement is configured to receive the bitstream with the input video format, wherein the input video format is a high fidelity format;

receive side information related to said video bitstream, said side information comprising at least: a video bitstream representing the original video source with a low fidelity input video format, coding parameters optimized based on knowledge of the original video source, and transform coefficients indicative of a residual between the original video source and a decoded version of the high fidelity format;

decode said received side information to generate transcoding guiding information;

estimate a representation of said bitstream with a low fidelity output format, based on the received bit stream and the generated transcoding guiding information;

add the transform coefficients of the side information to transform coefficients generated from the estimated representation of said bitstream with the low fidelity output format to improve the estimated representation of said bitstream with the low fidelity output format; and encode the improved estimated representation of said bitstream with the low fidelity output format.

10. The transcoder arrangement according to claim 9, wherein the residual between the original video source and a decoded version of the high fidelity format is a quantized residual.

11. The transcoder arrangement according to claim 9, wherein the transcoder arrangement is further configured to decode said received video bitstream, to provide pixel data as said representation of said received video bitstream.

12. The transcoder arrangement according to claim 9, wherein said side information further comprises residual information related to said input video format.

13. The transcoder arrangement according to claim 9, wherein the transcoder arrangement is configured to receive said side information separately from said video bitstream.

14. The transcoder arrangement according to claim 9, wherein the transcoder arrangement is configured to receive said side information together with said video bitstream.

15. The transcoder arrangement according to claim 9, wherein the transcoder arrangement is configured to identify an indication about the presence of said side information within said video bitstream.

16. The transcoder arrangement according to claim 9, wherein said input video format and said output video format comprise different color representations of a video, or different video codecs.

* * * * *